United States Patent [19]
Tozu et al.

[11] Patent Number: 5,752,752
[45] Date of Patent: May 19, 1998

[54] VEHICLE MOTION CONTROL SYSTEM

[75] Inventors: Kenji Tozu, Yokkaichi; Yoshiyuki Yasui, Kariya; Masanobu Fukami, Hazu gun; Takayuki Itoh, Nagoya; Norio Yamazaki, Kariya, all of Japan

[73] Assignee: Aisin Seiki Kabushiki Kaisha, Kariya, Japan

[21] Appl. No.: 758,245

[22] Filed: Nov. 27, 1996

[30] Foreign Application Priority Data

Nov. 30, 1995 [JP] Japan ................................ 7-338037

[51] Int. Cl.⁶ ........................................................ B60T 8/34
[52] U.S. Cl. ............................ 303/146; 303/140; 701/72
[58] Field of Search .................................. 303/140, 146, 303/153, 154, 139, 147; 364/426.016, 426.023, 424.051, 424.052; 701/72, 41, 71, 48; 180/197

[56] References Cited

U.S. PATENT DOCUMENTS

| | | |
|---|---|---|
| 4,898,431 | 2/1990 | Karnopp et al. |
| 5,088,040 | 2/1992 | Matsuda et al. ........................ 701/48 |
| 5,172,318 | 12/1992 | Meissner et al. |
| 5,597,215 | 1/1997 | Fischle et al. ........................ 303/139 |

FOREIGN PATENT DOCUMENTS 2-151556  6/1990  Japan
4-257757  9/1992  Japan

Primary Examiner—Douglas C. Butler
Attorney, Agent, or Firm—Burns, Doane, Swecker & Mathis, LLP

[57] ABSTRACT

The present invention is directed to a vehicle motion control system for maintaining vehicle stability by controlling the braking force applied to at least one wheel of a vehicle. A vehicle condition monitor monitors a condition of the vehicle in motion. A steering control unit actuates a braking unit to apply the braking force to at least one wheel on the basis of the output of the monitor and irrespective of depression of a brake pedal. An anti-skid control unit actuates the braking unit to control the braking force applied to at least one wheel in response to a rotational condition thereof during braking. A subordinate control unit actuates the braking unit to adjust the braking force control performed by the anti-skid control unit, in accordance with a predetermined relationship between the anti-skid control unit and the subordinate control unit. And, a priority control unit is adapted to give priority the anti-skid control unit over the steering control unit, and give priority the steering control unit over the subordinate control unit, when the condition for starting the braking force control performed by both of the anti-skid control unit and the steering control unit is fulfilled with respect to at least one wheel.

9 Claims, 16 Drawing Sheets

VEHICLE MOTION CONTROL SYSTEM

BACKGROUND OF THE INVENTION

1. Field of the Invention

The present invention relates to a vehicle motion control system for controlling vehicle motion, and more particularly to the control system which performs a steering control by braking to restrain an excessive oversteer and excessive understeer which will occur during, for example, cornering, by applying a braking force to each wheel of the vehicle irrespective of depression of a brake pedal, and which performs an anti-skid control to prevent a wheel from being locked during braking, by controlling the braking force applied to the wheel.

2. Description of the Related Arts

Recently, a vehicle is provided with a braking force control system for controlling the braking force applied to the vehicle to perform an anti-skid control, a traction control, a front-rear braking force distribution control, and etc. In the U.S. Pat. No. 4,898,431, for example, an apparatus for controlling vehicle motion through the use of a brake controlling system which compensates for the influence of lateral forces on the vehicle. The apparatus is constituted so as to control the braking force applied to the vehicle by the braking force control system in response to a comparison of a desired yaw rate with an actual yaw rate, thereby to improve the vehicle stability during the course of vehicle motion such as cornering.

In general, "oversteer" and "understeer" are used to indicate a vehicle steering characteristic. When the oversteer is excessive during vehicle motion such as cornering, the rear wheels of the vehicle have a tendency to slip excessively in the lateral direction to cause a decrease in turning radius of the vehicle. The oversteer occurs when a cornering force CFf of the front wheels largely exceeds a cornering force CFr of the rear wheels (i.e., CFf>>CFr). As shown in FIG. 18, when a vehicle VL is undergoing a cornering maneuver along a curve of a turning radius R, for example, a lateral acceleration Gy which is normal to the vehicle's path of motion is calculated in accordance with an equation of $Gy=V^2/R$, where "V" corresponds to a vehicle speed, and a total CFo of the cornering force is calculated in accordance with the following equation:

$$CFo = \Sigma CF = m \cdot Gy$$

where "m" corresponds to a mass of the vehicle VL. Accordingly, in the case where the sum of the cornering force CFf and the cornering force CFr is larger than the total cornering force CFo for the vehicle's cornering maneuver along the curve of the turning radius R (i.e., CFo<CFf+CFr), and the cornering force CFf of the front wheels largely exceeds the cornering force CFr of the rear wheels (i.e., CFf>>CFr), i.e., the oversteer is excessive, then the vehicle VL will be forced to turn in a direction toward the inside of the curve in the vehicle's path to cause a reduce in turning radius of the vehicle VL as shown in FIG. 18.

When the understeer is excessive during cornering, the lateral slip of the vehicle will be increased, the vehicle VL will be forced to turn in a direction toward the outside of the curve in the vehicle's path to cause an increase in turning radius of the vehicle VL as shown in FIG. 19. Thus, the excessive understeer occurs when the cornering force CFf of the front wheels is almost equal to the cornering force CFr of the rear wheels so as to be balanced with each other, or the latter is slightly larger than the former (i.e., CFf<CFr), and when the sum of the cornering force CFf and the cornering force CFr is smaller than the total cornering force CFo which is required for the vehicle's cornering maneuver along the curve of turning radius R (i.e., CFo>CFf+CFr), then the vehicle VL will be forced to turn in the direction toward the outside of the curve in the vehicle's path thereby to increase the turning radius R.

The excessive oversteer is determined on the basis of a vehicle side slip angle or vehicle slip angle β and a vehicle slip angular velocity D β, for example. When it is determined that the excessive oversteer occurs during cornering, a braking force will be applied to a front wheel located on the outside of the curve in the vehicle's path, for example, to produce a moment for forcing the vehicle to turn in the direction toward the outside of the curve, i.e., an outwardly oriented moment, in accordance with an oversteer restraining control, which may be called as a vehicle stability control. On the other hand, the excessive understeer is determined on the basis of a difference between a desired lateral acceleration and an actual lateral acceleration, or a difference between a desired yaw rate and an actual yaw rate, for example. When it is determined that the excessive understeer occurs while a rear-drive vehicle is undergoing a cornering maneuver, for example, the braking force will be applied to a front wheel located on the outside of the curve and applied to both of the rear wheels to produce a moment for forcing the vehicle to turn in the direction toward the inside of the curve, i.e., an inwardly oriented moment, in accordance with an understeer restraining control, which may be called as a course trace performance control.

In the recent vehicle, also provided are an anti-skid control mode wherein a hydraulic braking pressure supplied to a wheel brake cylinder is controlled in response to a rotational speed of a wheel so as to control the braking force applied to the wheel, and the like modes, so that the anti-skid control mode and the like are combined with the mode of steering control by braking to provide the effective vehicle motion control system as a whole. However, the braking force applied to the individual wheel is to be controlled in accordance with one of the control modes. Therefore, in the case where the anti-skid control starts when a certain wheel is being controlled, for example, in accordance with the steering control by braking mode, an interference might occur with respect to the wheel to be controlled. This interference occurs, because the anti-skid control is the control mode provided for reducing the braking force applied to the wheel which is about to be locked, whereas the steering control by braking is the control mode provided for applying the braking force to the wheel so as to control its steering angle.

In the case where both of the steering control by braking and the anti-skid control are to be performed, however, the interference might occur between one of the wheels to be controlled and the rest of the wheels. When the anti-skid control is initiated with respect to one wheel, a specific control may be made in advance of a next step for controlling the braking force applied to the other wheel having a certain relationship with the one wheel, e.g., the front and rear wheels, or the right and left wheels. In this case, therefore, during the anti-skid control is being performed, if the braking force is applied to one wheel in accordance with the steering control by braking, the braking force control with respect to the other wheel will be interfered thereby to initiate a yaw control, which is provided for compensating the interference of control occurring between the front and rear wheels, or between the right and left wheels.

As described above, the interference might occur, when both of the steering control by braking and the anti-skid control are performed simultaneously, with respect to the wheel to be controlled. Or, when the steering control by braking is performed with respect to the wheel to be controlled during the anti-skid control, the interference might be induced between the wheel to be controlled and the rest of the wheels. Either interference has to be avoided to maintain vehicle stability.

SUMMARY OF THE INVENTION

Accordingly, it is an object of the present invention to provide a vehicle motion control system which prevents an interference from occurring when a steering control by braking, an anti-skid control and the like are performed simultaneously.

It is another object of the present invention to provide a vehicle motion control system which prevents a yaw control or the like from being induced through a steering control by braking, when the anti-skid control is being performed with respect to a wheel to be controlled.

In accomplishing the above and other objects, a vehicle motion control system is provided for maintaining stability of an automotive vehicle when the vehicle in motion, by controlling a braking force applied to the front and rear wheels of the vehicle. In the system, therefore, braking means is provided for applying a braking force to each wheel of the vehicle. A vehicle condition monitor is provided for monitoring a condition of the vehicle in motion. The braking means is adapted to be actuated in response to depression of a brake pedal, and actuated on the basis of an output of the monitor and irrespective of depression of the brake pedal. Steering control means is provided for actuating the braking means to apply the braking force to at least one of the wheels on the basis of the output of the monitor and irrespective of depression of the brake pedal. Anti-skid control means is provided for actuating the braking means to control the braking force applied to at least one of the wheels in response to a rotational condition thereof during braking, on the basis of the output of the monitor means. Subordinate control means is provided for actuating the braking means to adjust the braking force control performed by the anti-skid control means, in accordance with a predetermined relationship between the anti-skid control means and the subordinate control means. And, priority control means is provided for giving priority the anti-skid control means over the steering control means, and giving priority the steering control means over the subordinate control means, when the condition for starting the braking force control performed by both of the anti-skid control means and the steering control means is fulfilled with respect to at least one of the wheels.

Preferably, the subordinate control means may include yaw control means for controlling the braking force applied to at least one wheel to be controlled out of the wheels, in accordance with a predetermined relationship with the braking force applied to at least one of the rest of the wheels, and on the basis of a relationship between the wheels during the control performed by the anti-skid control means. And, the vehicle motion control system may further include limiting means for preventing the yaw control means from controlling the braking force applied to the wheel to be controlled in accordance with the control performed by the steering control means, when the braking force is controlled by the anti-skid control means and the subordinate control means with respect to the wheel to be controlled.

The subordinate control means may include pre-control means for applying the braking force to the wheel to be controlled, in advance of the braking force control initiated by the anti-skid control means and/or the steering control means, and preferably the priority control means is adapted to give priority the steering control means over the pre-control means.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
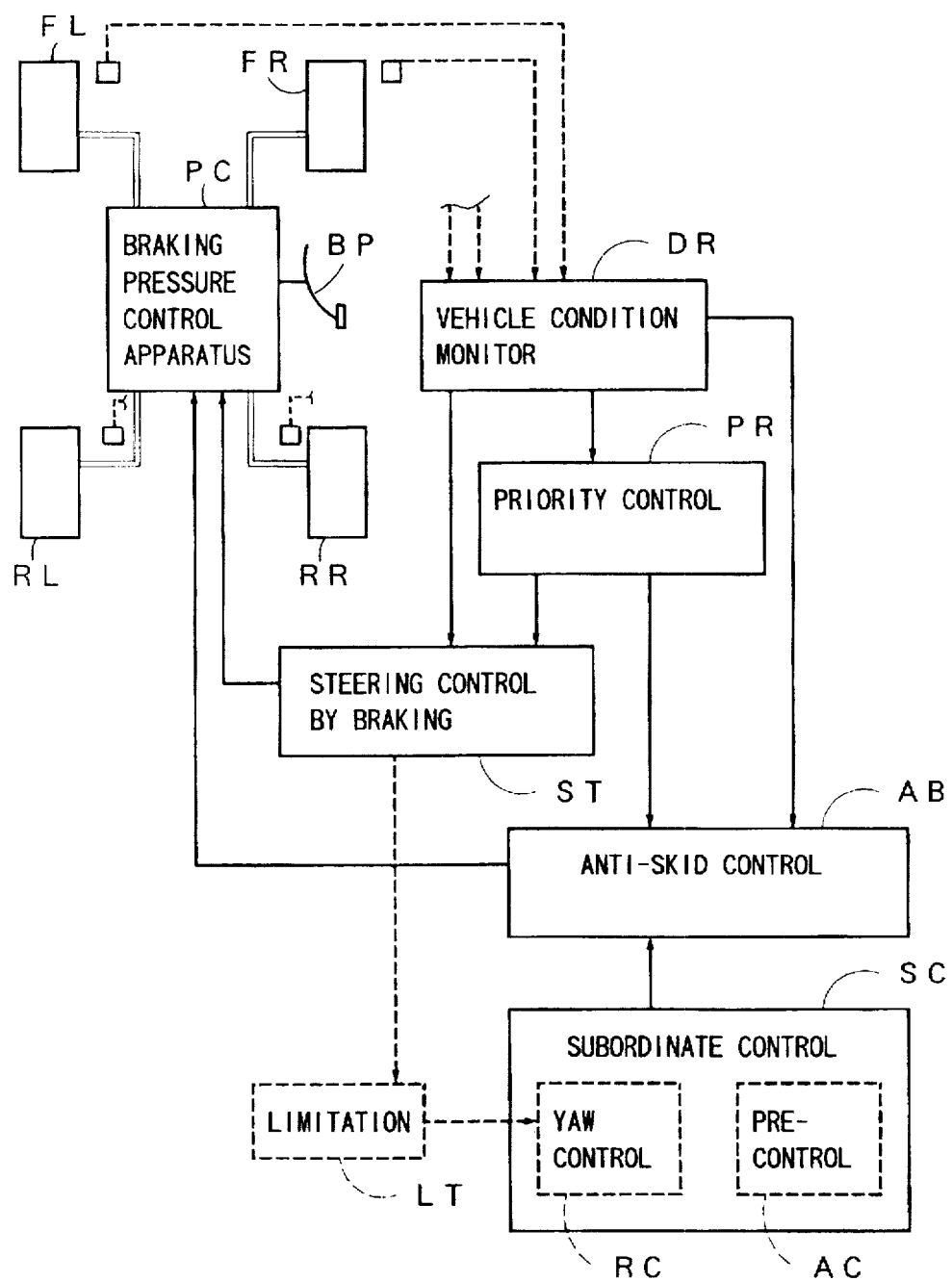
FIG. 1 is a general block diagram illustrating a vehicle motion control system according to the present invention.

Referring to FIG. 1, there is schematically illustrated a vehicle motion control system according to the present invention, which controls a braking force applied to front wheels FL, FR and rear wheels RL, RR of a vehicle individually. A vehicle condition monitor DR is provided for monitoring a condition of the vehicle in motion. A hydraulic braking pressure control apparatus PC is provided for applying the braking force to each wheel in response to depression of a brake pedal BP, and applying the braking force on the basis of an output of the monitor DR and irrespective of depression of the brake pedal BP. A steering control unit ST is provided for actuating the pressure control apparatus PC to apply the braking force to at least one of the wheels on the basis of the output of the monitor DR and irrespective of depression of the brake pedal BP. An anti-skid control unit AB is provided for actuating the pressure control apparatus PC to control the braking force applied to at least one of the wheels in response to a rotational condition thereof during braking. A subordinate control unit SC is provided for adjusting the control of the anti-skid control unit AB on the basis of a certain relationship with the the anti-skid control unit AB. And, a priority control unit PR is provided for giving priority the anti-skid control unit AB over the steering control unit ST, and giving priority the steering control unit ST over the subordinate control unit SC, when a condition for starting both of the anti-skid control unit AB and the steering control unit ST is fulfilled with respect to the wheel to be controlled out of the wheels of the vehicle.

The subordinate control unit SC includes a yaw control unit RC which is adapted to control the braking force applied to at least one wheel to be controlled out of the wheels, in accordance with a predetermined relationship with the braking force applied to at least one of the rest of the wheels, and on the basis of a relationship between the wheels during the control performed by the anti-skid control unit AB. Furthermore, a limiting unit LM is provided for preventing the yaw control unit RC from controlling the braking force applied to the wheel to be controlled in accordance with the control performed by the steering control unit ST, when the braking force is controlled by the anti-skid control unit AB and the subordinate control unit SC with respect to the wheel to be controlled. According to the present embodiment, the subordinate control unit SC further includes a pre-control unit AC which is adapted to apply the braking force to the wheel to be controlled, in advance of the braking force control initiated by the anti-skid control unit AB and/or the steering control unit ST, and the priority control unit PR is adapted to give priority the steering control unit ST over the pre-control unit AC.

The priority control unit PR is adapted to give priority among various control modes which are performed with respect to the front wheels FR, FL in a rear-drive vehicle, for example, in accordance with the following order of priority. That is, priority is given, in sequence, to an anti-skid control, an oversteer restraining control, an understeer restraining control, a pre-anti-skid control, a right-left yaw control, a pre-steering control by braking, and a standby control, which will be described later in detail. With respect to a combination of more than two of the control modes as described above, a preceding control mode is given priority over the control modes following it. With respect to the rear wheels RR, RL in the rear-drive vehicle, various control modes are performed in accordance with the following order of priority, and a preceding control mode in a combination of more than two of the control modes is given priority over the control modes following it. That is, priority is given, in sequence, to the anti-skid control, the understeer restraining control, the oversteer restraining control, a front-rear braking force distribution control, the pre-anti-skid control, a front-rear yaw control, a traction control, the pre-steering control by braking, and the standby control, which will be described later in detail.

The pressure control apparatus PC may include a master cylinder which generates a hydraulic braking pressure in response to depression of the brake pedal BP, and which will be described later, and an auxiliary pressure source having a hydraulic pump and an accumulator, which generates the hydraulic braking pressure irrespective of depression of the brake pedal BP, even in the absence of the brake pedal input, and which will be described later. The vehicle condition monitor DR may be so constituted to detect wheel speeds of the wheels, vehicle lateral acceleration, yaw rate and so on, and then calculate wheel accelerations, an estimated vehicle speed, and a vehicle slip angle on the basis of the detected signals, so that the condition of the vehicle in motion is monitored to determine if an excessive oversteer and/or an excessive understeer occur, and the locking condition of the wheels.

In the case where the yaw moment of the vehicle is to be controlled during the anti-skid control, therefore, if the right-left yaw control or front-rear yaw control is performed for controlling the braking force of the front right and left wheels, or the braking force of the front and rear wheels to be reduced, and the steering control by braking is performed for controlling the braking force of at least one of the wheels to be applied, simultaneously, the steering control by braking is given priority. Regarding the wheels in the yaw moment control of the vehicle, when the steering control by braking is being performed with respect to one of the front wheels, the right-left yaw control will not be performed, even if the anti-skid control is initiated.

Figure 2:
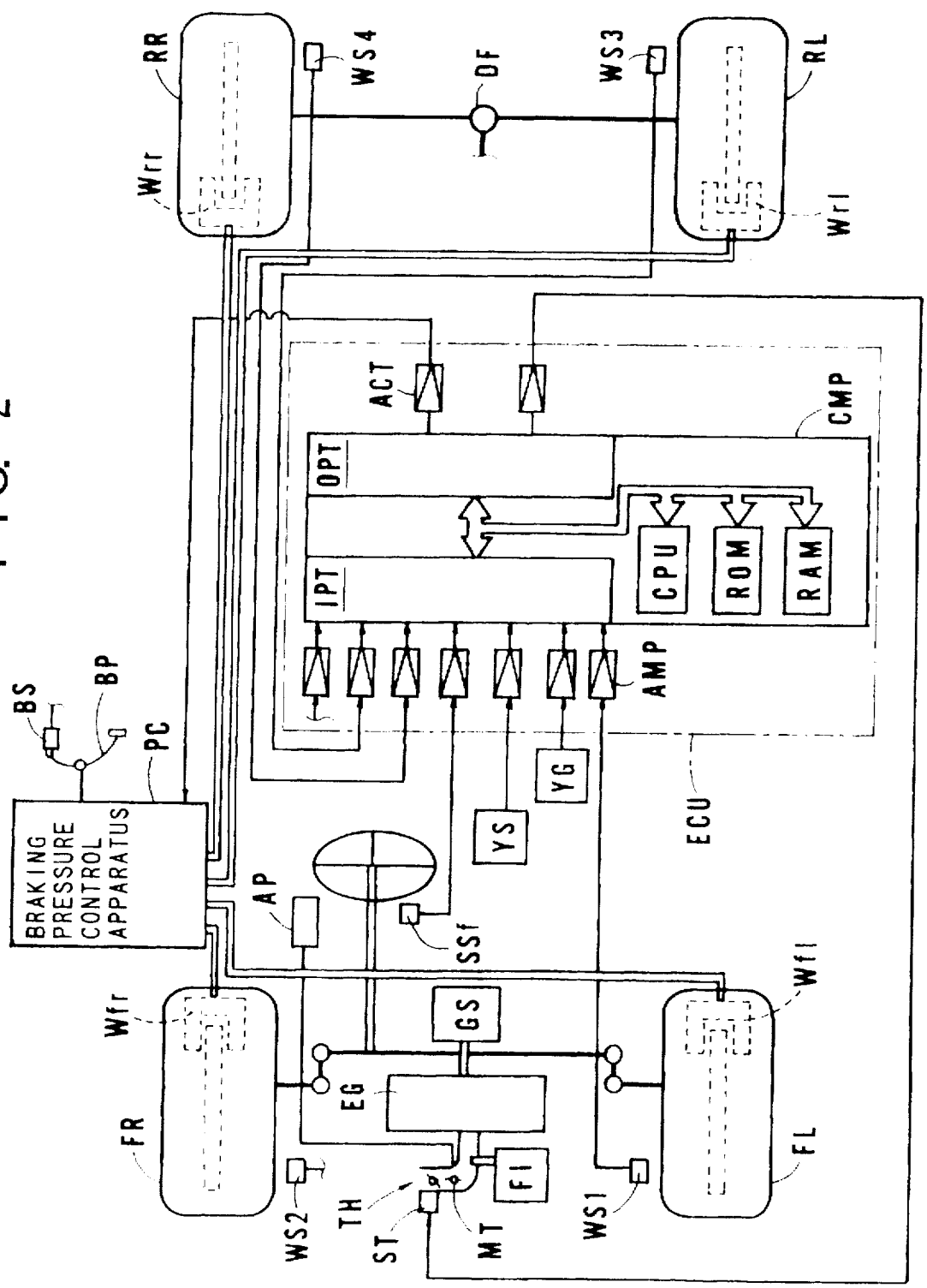
FIG. 2 is a schematic block diagram of a vehicle motion control system of an embodiment of the present invention.

More specifically, the details of the embodiment disclosed in FIG. 1 are illustrated in FIGS. 2 to 17. As shown in FIG. 2, the vehicle has an engine EG provided with a fuel injection apparatus FI and a throttle control apparatus TH which is arranged to control a main throttle opening of a main throttle valve MT in response to operation of an accelerator valve AP. The throttle control apparatus TH has a sub-throttle valve ST which is actuated in response to an output signal of an electronic controller ECU to control a sub-throttle opening. Also, the fuel injection apparatus FI is actuated in response to an output signal of the electronic controller ECU to control the fuel injected into the engine EG. According to the present embodiment, the engine EG is operatively connected with the rear wheels RL, RR through a transmission GS and a differential gear DF to provide a rear-drive system, but the present embodiment is not limited to the rear-drive system.

With respect to a braking system according to the present embodiment, wheel brake cylinders Wfl, Wfr, Wrl, Wrr are operatively mounted on the front wheels FL, FR and rear wheels RL, RR of the vehicle, respectively, and which is fluidly connected to a hydraulic braking pressure control apparatus PC. The wheel FL designates the wheel at the front left side as viewed from the position of a driver's seat, the wheel FR designates the wheel at the front right side, the wheel RL designates the wheel at the rear left side, and the wheel RR designates the wheel at the rear right side.

Figure 17:
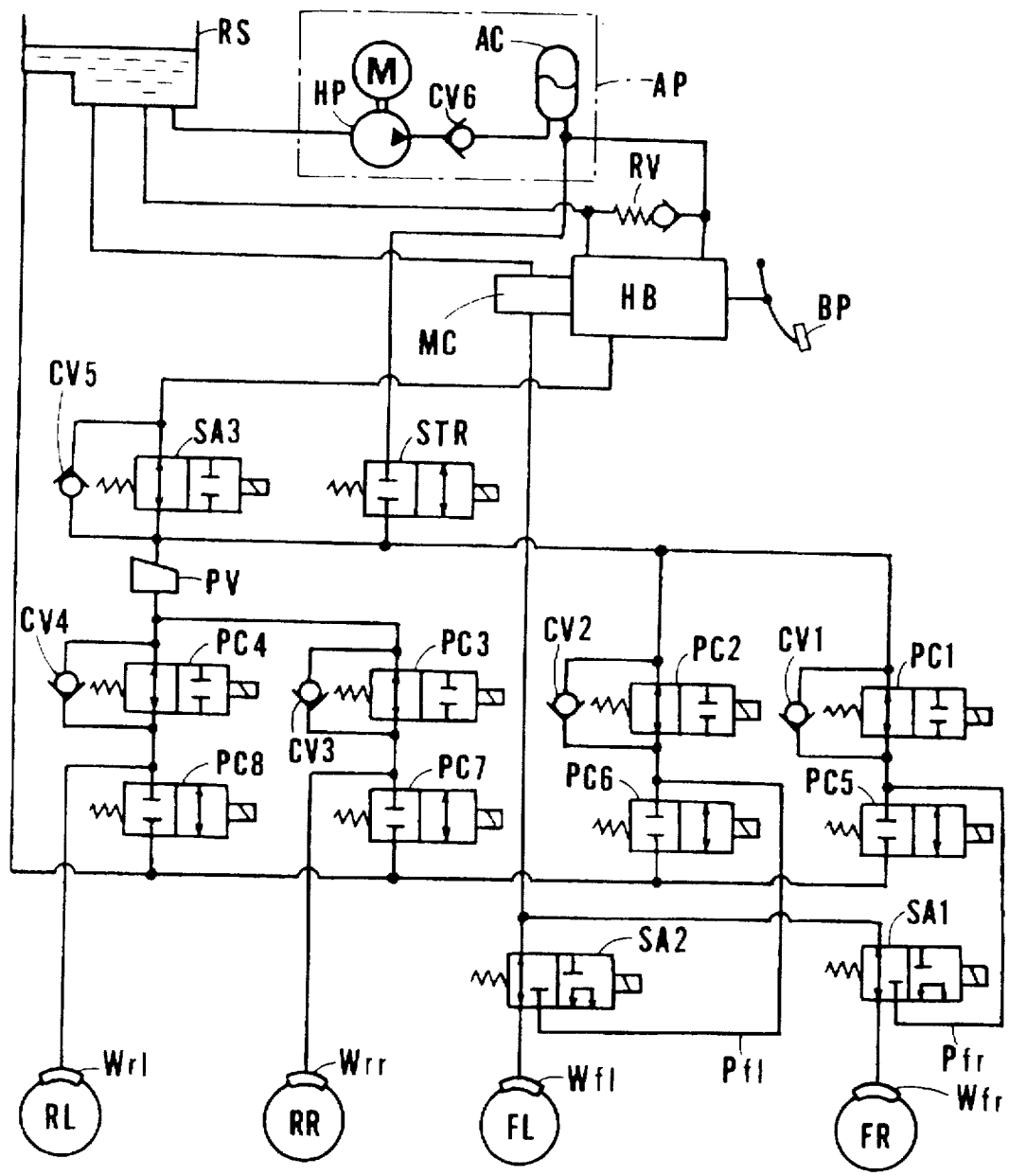
FIG. 17 is a block diagram illustrating an embodiment of a hydraulic braking pressure control apparatus for use in the the above embodiment.
Figure 18:
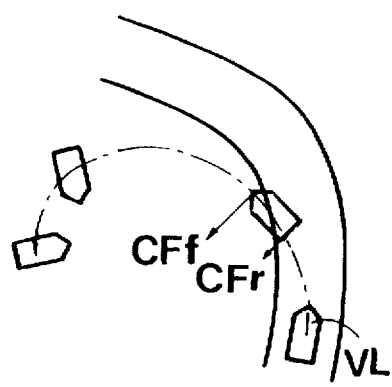
FIG. 18 is a drawing illustrating a state where an excessive oversteer occurs while a conventional vehicle is turning to the left.
Figure 19:
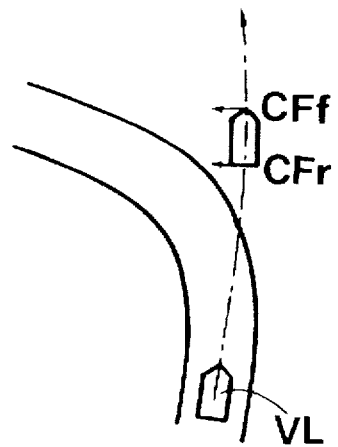
FIG. 19 is a drawing illustrating a state where an excessive understeer occurs while the conventional vehicle is turning to the left.

According to the present embodiment, a front-rear dual circuit system is employed, while a diagonal circuit system may be employed. The pressure control apparatus PC is arranged to be actuated in response to depression of a brake pedal BP to control the hydraulic pressure supplied to each wheel brake cylinder, and may be selected from various known types. The pressure control apparatus PC in the present embodiment may be arranged as illustrated in FIG. 17 which will be explained in detail.

As shown in FIG. 2, at the road wheels FL, FR, RL and RR, there are provided wheel speed sensors WS1 to WS4 respectively, which are connected to an electronic controller ECU, and by which a signal having pulses proportional to a rotational speed of each wheel, i.e., a wheel speed signal is fed to the electronic controller ECU. There are also provided a brake switch BS which turns on when the brake pedal BP is depressed, and turns off when the brake pedal BP is released, a front steering angle sensor SSf for detecting a steering angle δ f of the front wheels FL, FR, a lateral acceleration sensor YG for detecting a vehicle lateral acceleration, and a yaw rate sensor YS for detecting a yaw rate of the vehicle. These are electrically connected to the electronic controller ECU. According to the yaw rate sensor YS, a varying rate of rotational angle of the vehicle about a normal on the center of gravity of the vehicle, i.e., a yaw angular velocity or yaw rate γ is detected and fed to the electronic controller ECU. The yaw rate γ may be calculated on the basis of a wheel speed difference Vfd between the wheel speeds of non-driven wheels (wheel speeds Vwfl, Vwfr of the front wheels FL, FR in the present embodiment), i.e., Vfd=Vwfr−Vwfl, so that the yaw rate sensor YS may be omitted. Furthermore, between the wheels RL and RR may be provided a steering angle control apparatus (not shown), which enables a motor (not shown) to control a steering angle of the wheels RL, RR in response to the output of the electronic controller ECU.

As shown in FIG. 2, the electronic controller ECU is provided with a microcomputer CMP which includes a central processing unit or CPU, a read-only memory or ROM, a random access memory or RAM, an input port IPT, an output port OPT and etc. The signals detected by each of the wheel speed sensors WS1 to WS4, brake switch BS, front steering angle sensor SSf, yaw rate sensor YS and lateral acceleration sensor YG are fed to the input port IPT via respective amplification circuits AMP and then to the central processing unit CPU. Then, control signals are fed from the output port OPT to the throttle control apparatus TH and hydraulic pressure control apparatus PC via the respective driving circuits ACT. In the microcomputer CMP, the read-only memory ROM memorizes a program corresponding to flowcharts shown in FIGS. 4 to 14, the central processing unit CPU executes the program while the ignition switch (not shown) is closed, and the random access memory RAM temporarily memorizes variable data needed to execute the program. A plurality of microcomputers may be provided for each control such as throttle control, or may be provided for performing various controls, and electrically connected to each other.

Figure 3:
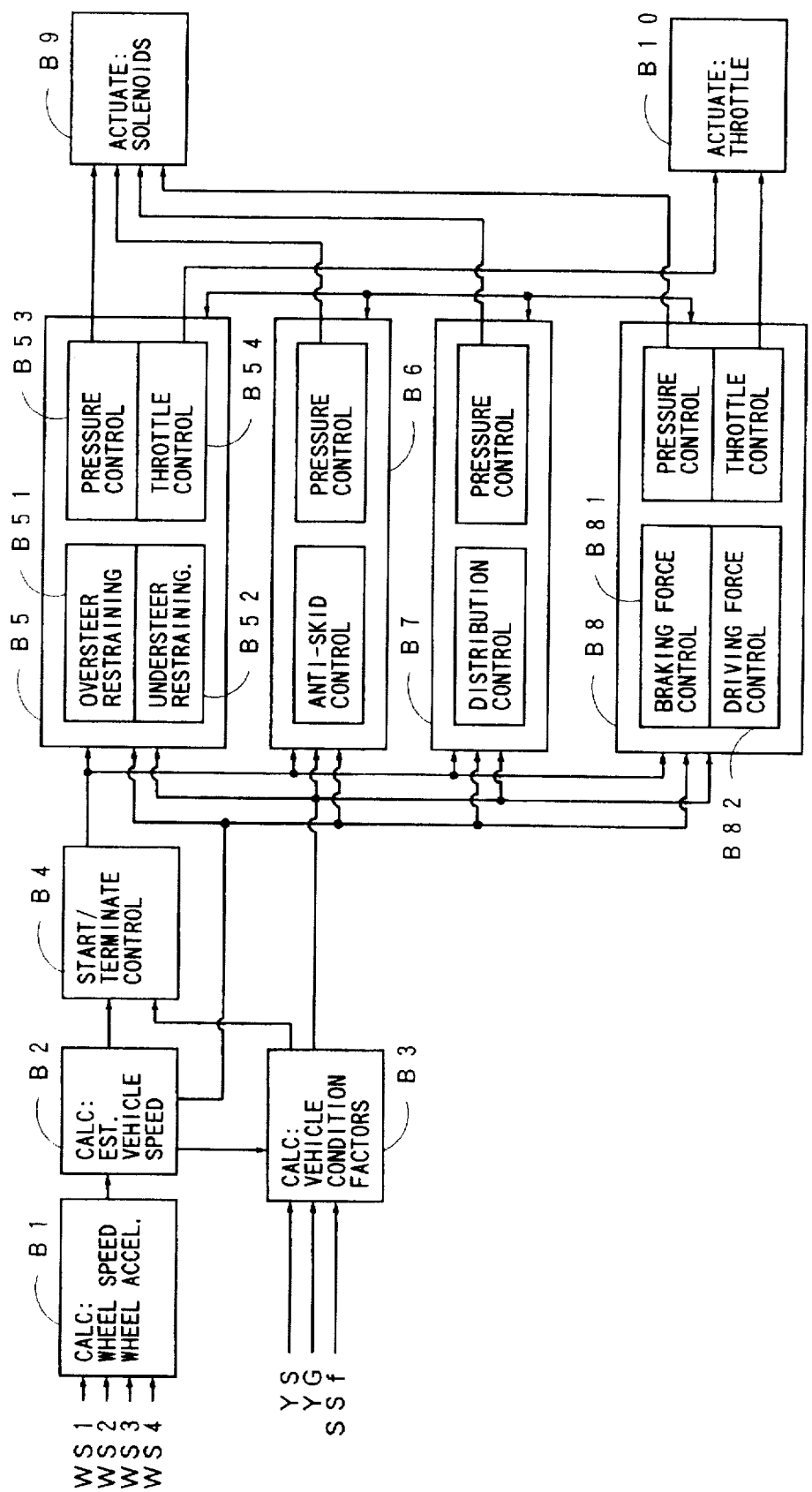
FIG. 3 is a diagram of blocks processed in the system of the above embodiment of the present invention.

FIG. 3 shows blocks processed in the microcomputer CMP. In a block B1, on the basis of the output signals of the wheel speed sensors WS1−WS4, a wheel speed Vw ( represents one of the wheels FL, FR, RL, RR) and a wheel acceleration DVw of each wheel are calculated, and on the basis of the results calculated in the block B1, an estimated vehicle speed Vso is calculated for each wheel in a block B2. In a block B3, various factors indicative of the vehicle condition are calculated on the basis of the output signals from the yaw rate sensor YS, lateral acceleration sensor YG, front steering angle sensor SSf and etc., then in a block B4 a start or terminating process is made with respect to various controls for each wheel as explained hereinafter.

Then, in a block B5, the steering control by braking is performed, so that the oversteer restraining control is performed in a block B51, and the understeer restraining control is performed in a block B52, in order to maintain a stability and a course trace performance of the vehicle during cornering. The oversteer restraining control is provided for applying a braking force to a front wheel located on the outside of the curve in the vehicle's path of motion, for example, and forcing the vehicle to turn in a direction toward the outside of the curve, so as to prevent the excessive oversteer from occurring during cornering, with various solenoid valves which will be described later in detail, in the hydraulic pressure control apparatus energized or de-energized in a block B9 through a block B53. On the other hand, the understeer restraining control is provided for applying a braking force to a front wheel located on the outside of the curve and both of the rear wheels, for example, and forcing the vehicle to turn in a direction toward the inside of the curve and reduce the vehicle speed, so as to prevent the excessive understeer from occurring during cornering. If necessary, a throttle control may be made further in a block B10 through a block B54, so as to maintain the desired vehicle turning motion.

In a block B6, the anti-skid control is performed, so that a braking force applied to each wheel is controlled so as to prevent the wheel from being locked during the vehicle braking operation. In a block B7, the front-rear braking force distribution control is performed, so that a distribution between the braking force applied to the rear wheels and the braking force applied to the front wheels is controlled so as to maintain the vehicle stability during the vehicle braking operation. The solenoid valves in the hydraulic pressure control apparatus are energized or de-energized in a block B9 to perform the controls in the block B6 and block B7. Further, in a block B8, the traction control is performed, so that a braking force is applied to a driven wheel through a block B81 and the throttle control is performed in the block B10 through a block B82, so as to prevent the driven wheel from slipping during the vehicle driving operation.

Figure 4:
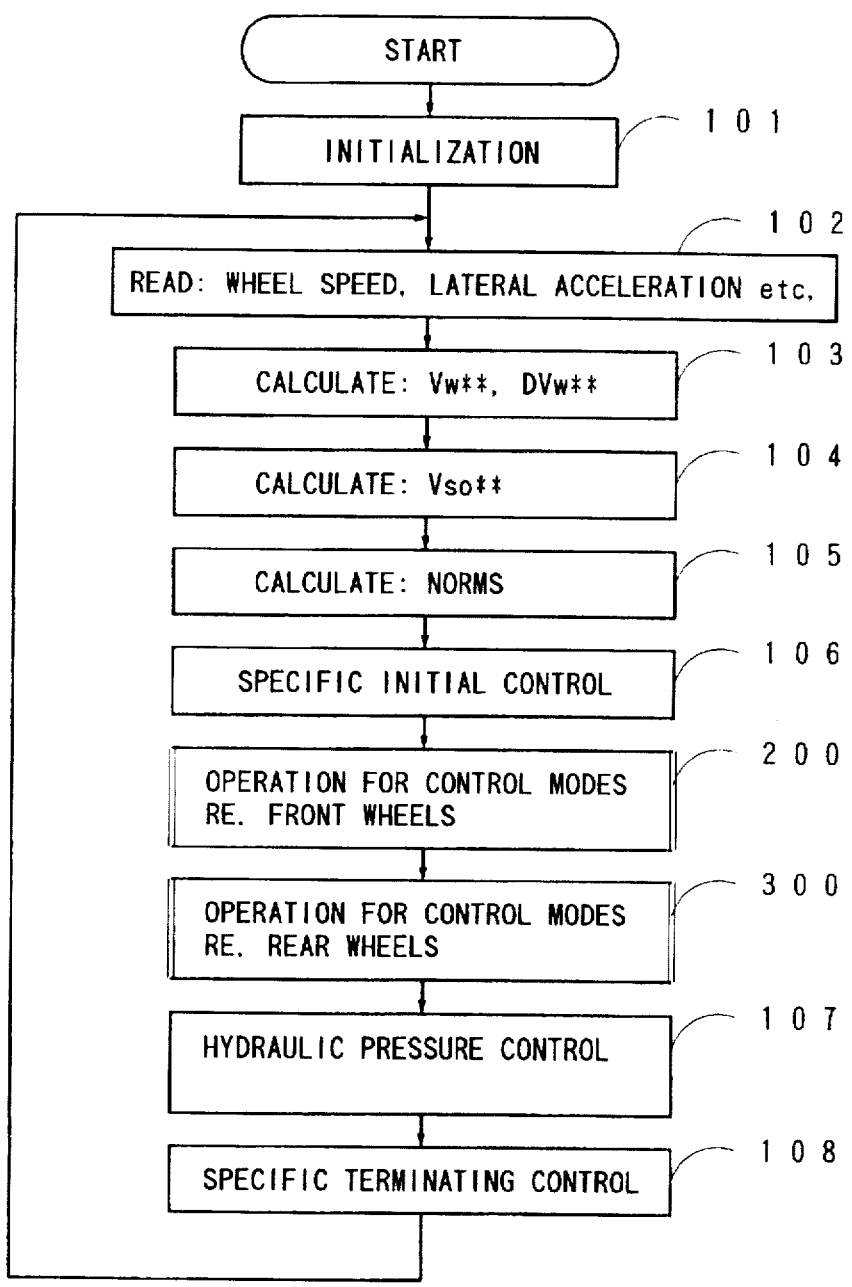
FIG. 4 is a flowchart showing a main routine of the vehicle motion control according to the above embodiment of the present invention.

According to the present embodiment as constituted above, a program routine for the vehicle motion control including the steering control by braking, anti-skid control and so on is executed by the electronic controller ECU, as will be described hereinafter with reference to FIGS. 4 to 14. The program routine starts when an ignition switch (not shown) is turned on. At the outset, the program for the vehicle motion control as shown in FIG. 4 provides for initialization of the system at Step 101 to clear various data. At Step 102, the signals detected by the wheel speed sensors WS1 to WS4 are read by the electronic controller ECU, and also read the signal (steering angle δf) detected by the front steering angle sensor SSf, the signal (actual yaw rate γ) detected by the yaw rate sensor YS, and the signal (actual lateral acceleration Gya) detected by the lateral acceleration sensor YG.

Then, the program proceeds to Step 103 where the wheel speed Vw of each wheel is calculated, and further it is differentiated so as to provide the wheel acceleration DVw. At Step 104, the estimated vehicle speed Vso is calculated for each wheel on the basis of the wheel speed Vw. The estimated vehicle speed Vso may be normalized to reduce the error caused by a difference between the wheels located on the inside and outside of the curve while cornering. That is, the estimated and normalized vehicle speed NVso is calculated in accordance with the following equation:

$$NVso^{}=Vso^{}(n)-\Delta Vr^{**}(n)$$

where ΔVr(n) is a correction factor provided for correction during cornering, as follows: That is, the correction factor is set on the basis of a turning radius R and γ·VsoFW (FW represents front wheels) which is nearly equal to the lateral acceleration Gya, according to a map (not shown) provided for each wheel except for a reference wheel. If ΔVrFL is employed as a reference value for example, it is set to be zero. Then, ΔVrFR is set according to a map provided for the difference between two wheels located on the inside and outside of the curve during cornering. With respect to the rear wheels, ΔVrRL is set according to a map provided for the difference between two wheels both located on the inside of the curve during cornering, while ΔVrRR is set according to a map provided for the difference between two wheels both located on the outside of the curve during cornering, and also according to the map provided for the difference between two wheels located on the inside and the outside of the curve during cornering. Furthermore, an estimated vehicle speed Vso (=MAX [Vw]) is differentiated to provide a longitudinal vehicle acceleration DVso.

The program further proceeds to Step 105 where the estimated vehicle speed Vso (=MAX [Vw]) is differentiated to provide a longitudinal vehicle acceleration DVso. On the basis of the data calculated heretofore, norms for use in various control modes such as the anti-skid control are calculated. According to the present embodiment, a desired slip rate (So), a desired acceleration and a desired yaw rate are calculated. Then, after a specific initial control for providing initial pressure has been made at Step 106, actual slip rates of the front wheels and the rear wheels are calculated in accordance with control modes provided for each wheel, at Steps 200, 300, respectively. According to the present embodiment, calculated is an actual slip rate Sa, for use in the anti-skid control for example, on the basis of the wheel speed Vw and the estimated vehicle speed Vso (or, the estimated and normalized vehicle speed NVso) for each wheel, which are calculated at Steps 103 and 104, respectively, in accordance with the following equation:

$$Sa^{}=(Vso^{}-Vw^{}-BVw^{})/Vso^{**}$$

where BVw** corresponds to a bias speed. And, various actual slip rates are calculated in accordance with the control modes, respectively. Based on the actual slip rate provided in accordance with each control mode, and the desired slip rate calculated at Step 105, the hydraulic pressure servo control is performed at Step 107, then the program proceeds to Step 108 where a specific terminating control is performed, and then the program returns to Step 102.

Figure 5:
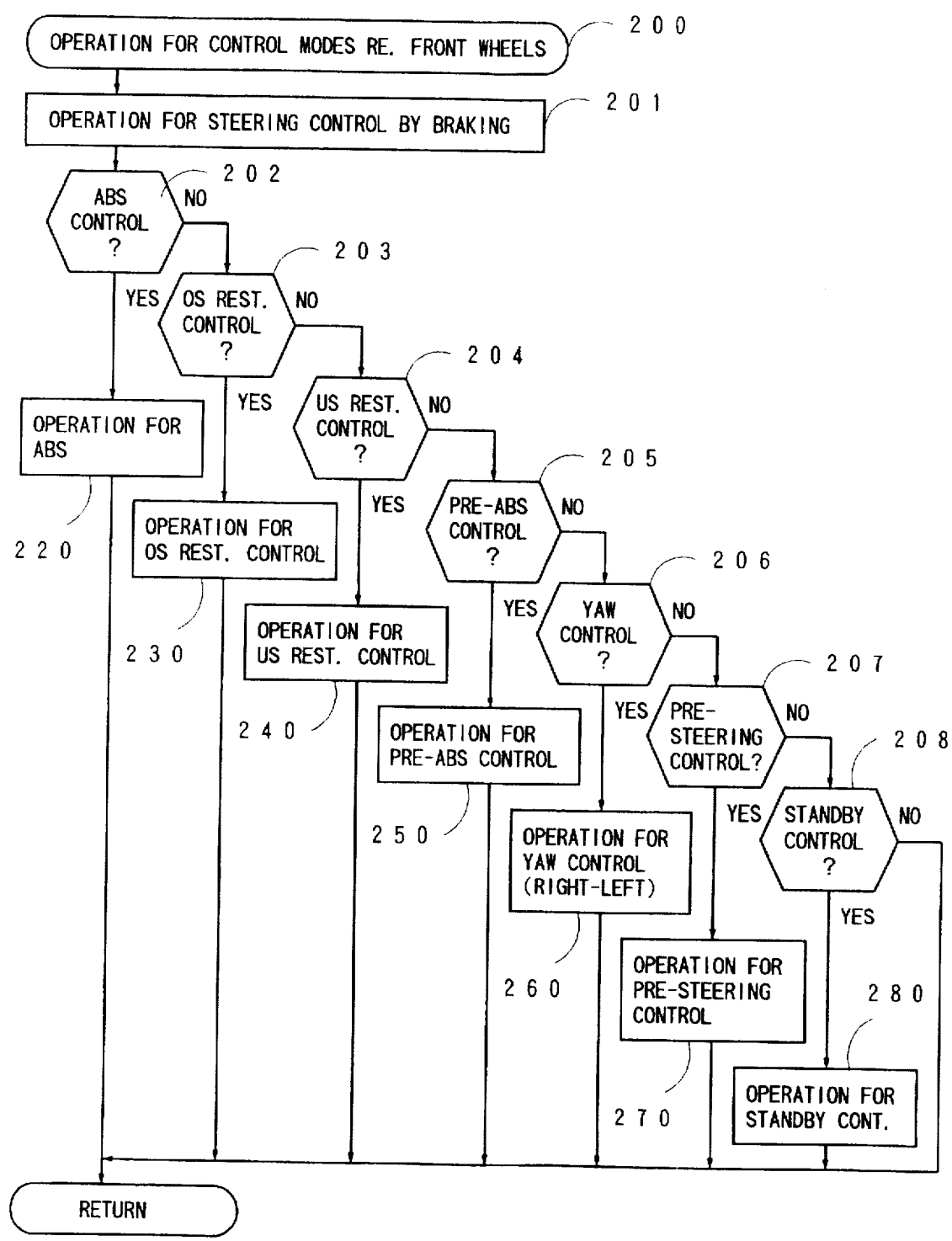
FIG. 5 is a flowchart showing an operation for control modes with respect to the front wheels, according to the above embodiment of the present invention.

FIG. 5 shows a flowchart of the operation for the control modes executed at Step 200 in FIG. 4 with respect to the front wheels. At Step 201, the operation for the steering control by braking is executed to calculate a slip rate correction factor ΔSv for use in the steering control by braking, which is added to the desired slip rate calculated at Step 105 to provide a desired slip rate St. In accordance with this desired slip rate St, the hydraulic pressure servo control will be performed at Step 107, so that the pressure control apparatus PC is controlled so as to apply the braking force to each wheel in response to the condition of the vehicle in motion. This steering control by braking is to be added to each control performed in all of the control modes described later. Thereafter, the program proceeds to the Steps following Step 202, the operation for each control mode with respect to each wheel will be executed, in such a manner that a determination of starting each control mode is made sequentially in accordance with the following Steps 202 to 208. That is, the preceding Step is given priority over the following Step from Step 202 to Step 208 as shown in FIG. 5. At Steps 203, 204, 207 and 208, the determination of starting each control is made when the steering control by braking is performed, while the determination of starting each control is made at Steps 202, 205 and 206 as shown in FIG. 5, wherein "ABS" corresponds to the anti-skid control, when the anti-skid control is performed.

First of all, it is determined at Step 202 whether a condition for starting the anti-skid control is fulfilled or not. If it is determined that the anti-skid control is to be started, the operation for performing the anti-skid control (plus the the steering control by braking) is executed at Step 220 to provide a desired slip rate which serves as a desired target for the control. If it is determined at Step 202 that the condition for starting the anti-skid control (ABS) has not been fulfilled, the program proceeds to the Steps following Step 203, where the determination of starting the control modes which are subordinate to the anti-skid control will be made sequentially as follows.

At Step 203, it is determined whether the condition for starting the oversteer restraining control is fulfilled or not. If it is determined that the oversteer restraining control is to be started, the program proceeds to Step 230 where the operation for the oversteer restraining control is executed. If it is determined that the condition for starting the oversteer restraining control has not been fulfilled, the program proceeds to Step 204, where it is determined whether the condition for starting the understeer restraining control is fulfilled or not. If it is determined that the understeer restraining control is to be started, the program proceeds to Step 240 where the operation for the understeer restraining control is executed. In the case where neither of the condition for starting the oversteer restraining control nor the condition for starting the understeer restraining control has been fulfilled, the program proceeds to Step 205 where it is determined whether the condition for starting a pre-anti-skid control, i.e., a pre-ABS control is fulfilled or not. In other words, if it is determined at Steps 203 and 204 that both of the excessive oversteer and excessive understeer occur simultaneously, the oversteer restraining control is given priority over the understeer restraining control, with respect to the front wheels.

At Step 205, it is determined whether the condition for starting the pre-ABS control is fulfilled or not. If the condition is fulfilled, the program proceeds to Step 250 where the operation for performing the pre-ABS control is executed. The pre-ABS control is a control for predicting a transition to the anti-skid control with respect to the wheel to be controlled, in accordance with the relationship between the lateral acceleration and the slip rate, for example, and starting a specific initial control in advance. That is, the pre-ABS control relates only to the wheel to be controlled, whereas the yaw control which will be described later is to be performed in accordance with the relationship between the wheel to be controlled and other wheels.

If it is determined that the condition for starting the pre-ABS control has not been fulfilled, the program proceeds to Step 206 where it is determined whether the condition for starting the right-left yaw control is fulfilled or not. If the condition is fulfilled, the program proceeds to Step 260 where the operation for the right-left yaw control is executed. The right-left yaw control is a control for adjusting the braking force applied to the right and/or left wheels, in such a manner that when the anti-skid control is initiated with respect to one of the front right and front left wheels, the increasing rate of the braking force applied to the other of the wheels will be reduced by providing the pulse pressure increasing mode for the control of the hydraulic pressure in the wheel brake cylinder of the other wheel.

For example, during the vehicle is running on a split road surface, if the vehicle is braked when one of the front wheels which is located on a road surface of a relatively low coefficient of friction and the other of the wheels which is located on a road surface of a relatively high coefficient of friction, the wheel located on the road surface of the lower coefficient of friction is about to be locked at first. Therefore, the hydraulic pressure in the wheel brake cylinder of the wheel which is located on the road surface of the lower coefficient of friction will be reduced to prevent the wheel from being locked. In this case, if the hydraulic pressure is applied, in response to depression of the brake pedal, to the wheel brake cylinder of the wheel which is located on the road surface of the higher coefficient of friction, a relatively large braking force will be applied to this wheel, so that the vehicle might be rotated. In order to prevent a rapid increase of the braking force from being applied to the wheel which is located on the road surface of the higher coefficient of friction, therefore, the right-left control provides the pulse pressure increasing mode to gradually increase the braking force. In other words, the braking force applied to the wheel which is located on the road surface of the higher coefficient of friction, is controlled to be reduced in advance, before the anti-skid control is initiated with respect to that wheel. In contrast to the steering control by braking which is adapted to apply the braking force to the right and/or left wheels to control a yaw moment of the vehicle, the right-left yaw control is adapted to reduce the braking force applied to the right and/or left wheels to control the yaw moment of the vehicle, during the anti-skid control.

In the case where an excessive oversteer occurs when the vehicle is braked during cornering, for example, a relatively large load is applied to the wheel which is located on the outside of the curve, comparing with the load applied to the wheel which is located on the inside of the curve, so that the anti-skid control will start with respect to the wheel which is located on the inside of the curve, at the outset. In order to prevent the excessive oversteer from occurring, it is necessary in general to apply a relatively large braking force to the wheel which is located on the outside of the curve. However, according to the right-left yaw control, the pulse pressure increasing mode is selected to gradually increase the braking force applied to the wheel which is located on the outside of the curve, so that it will be impossible to perform the steering control by braking. Therefore, the steering control by braking, i.e., the oversteer restraining control or the understeer restraining control, is given priority over the right-left yaw control.

At Step 207, it is determined whether the condition for starting the pre-steering control by braking (hereinafter, simply referred to as the pre-steering control) is fulfilled or not. If the condition is fulfilled, the program proceeds to Step 270 where the operation for the pre-steering control is executed. The pre-steering control is a control for providing a controlled variable, in advance of the steering control by braking for each wheel, so as to supply the hydraulic pressure into the wheel brake cylinder of the wheel to be controlled, in accordance with the coefficient of friction of the road. If it is determined that the condition for starting the pre-steering control has not been fulfilled, the program proceeds to Step 208 where it is determined whether the condition for starting the standby control is fulfilled or not. If the condition is fulfilled, the program proceeds to Step 280 where the operation for the standby control is executed. The standby control is a control for supplying the hydraulic pressure into the wheel brake cylinder of the wheel to be controlled, in advance of the steering control by braking for each wheel. Since the standby control is performed on the premise that the hydraulic pressure has not been supplied into the wheel brake cylinder of the wheel to be controlled, if the hydraulic pressure has been supplied into the wheel brake cylinder, as in the anti-skid control for example, the standby control is not performed.

Figure 6:
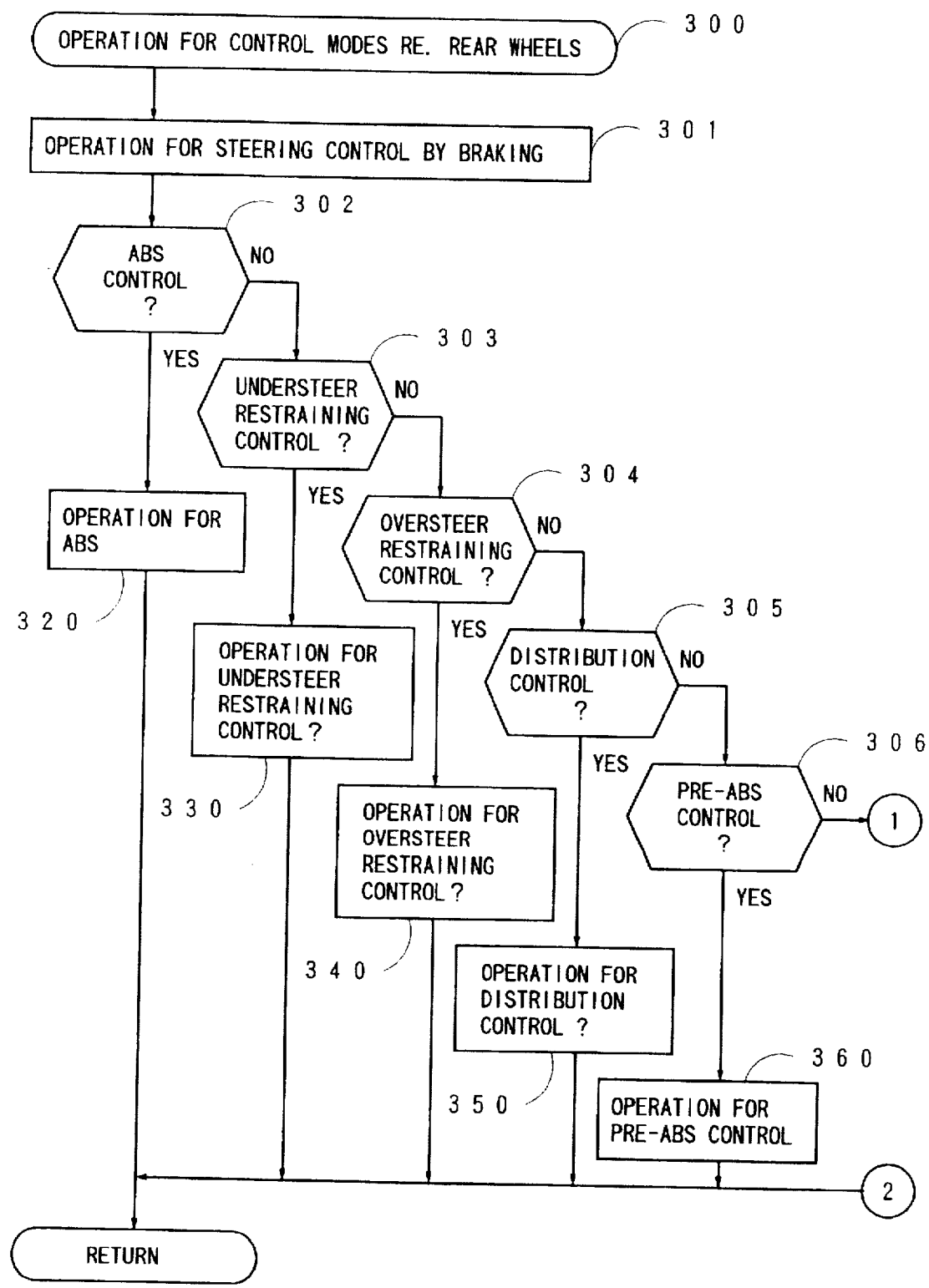
FIG. 6 is a flowchart showing an operation for control modes with respect to the rear wheels, according to the above embodiment of the present invention.
Figure 7:
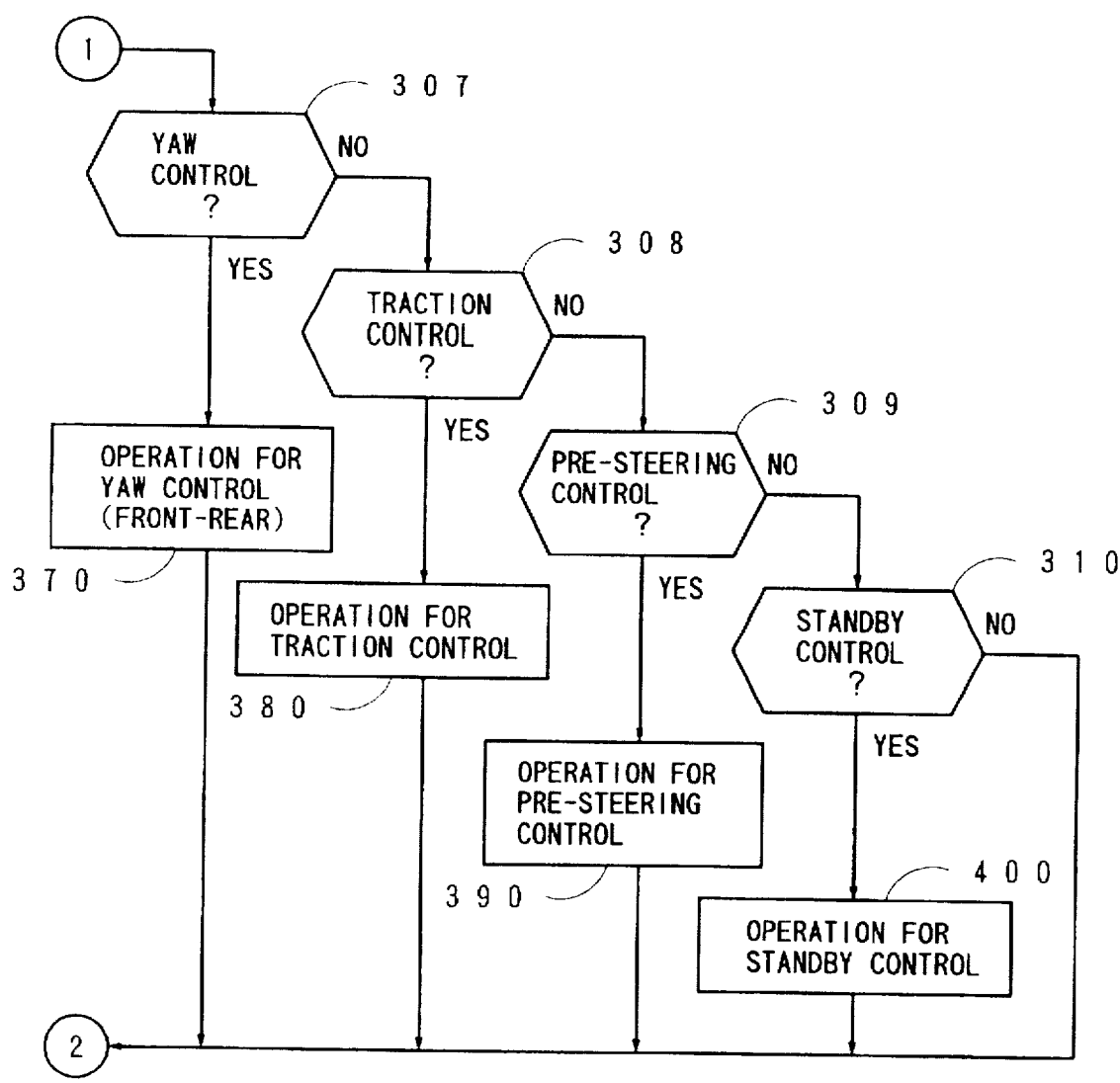
FIG. 7 is a flowchart showing the operation for control modes with respect to the rear wheels, according to the above embodiment of the present invention.

FIGS. 6 and 7 show a flowchart of the operation for the control modes executed at Step 300 in FIG. 4 with respect to the rear wheels. After the operation for the steering control by braking is executed at Step 301, the program proceeds to Steps 302 to 310 where the determination of starting each control mode is performed sequentially. The control modes performed with respect to the rear wheels are substantially the same as those performed with respect to the front wheels as described before. According to the present embodiment of the rear-drive vehicle, however, Steps 305, 350 and Steps 308, 380 are added to the flowchart as shown in FIG. 5, and Steps 307, 370 are provided in connection with the relationship between the rear wheels and the front wheels. Furthermore, the understeer restraining control is given priority over the oversteer restraining control, with respect to the rear wheels.

When either one of the front wheels is about to be locked thereby to start the anti-skid control with respect to that front wheel, it is presumed that one of the rear wheels is about to be locked immediately thereafter. Therefore, the front-rear yaw control is provided for restraining a rapid increase of the hydraulic pressure supplied to the wheel brake cylinders of the rear wheels. For example, when the anti-skid control is initiated with respect to one of the front wheels, the pulse pressure increasing mode will be provided for the control of the hydraulic pressure in the wheel brake cylinder of the rear wheel which is placed on the same side of the curve as the one front wheel. Consequently, the braking force will be applied gradually to the rear wheel without causing the rapid increase of the braking force, so that the wheel is prevented from locking to keep the stability of the vehicle.

Figure 8:
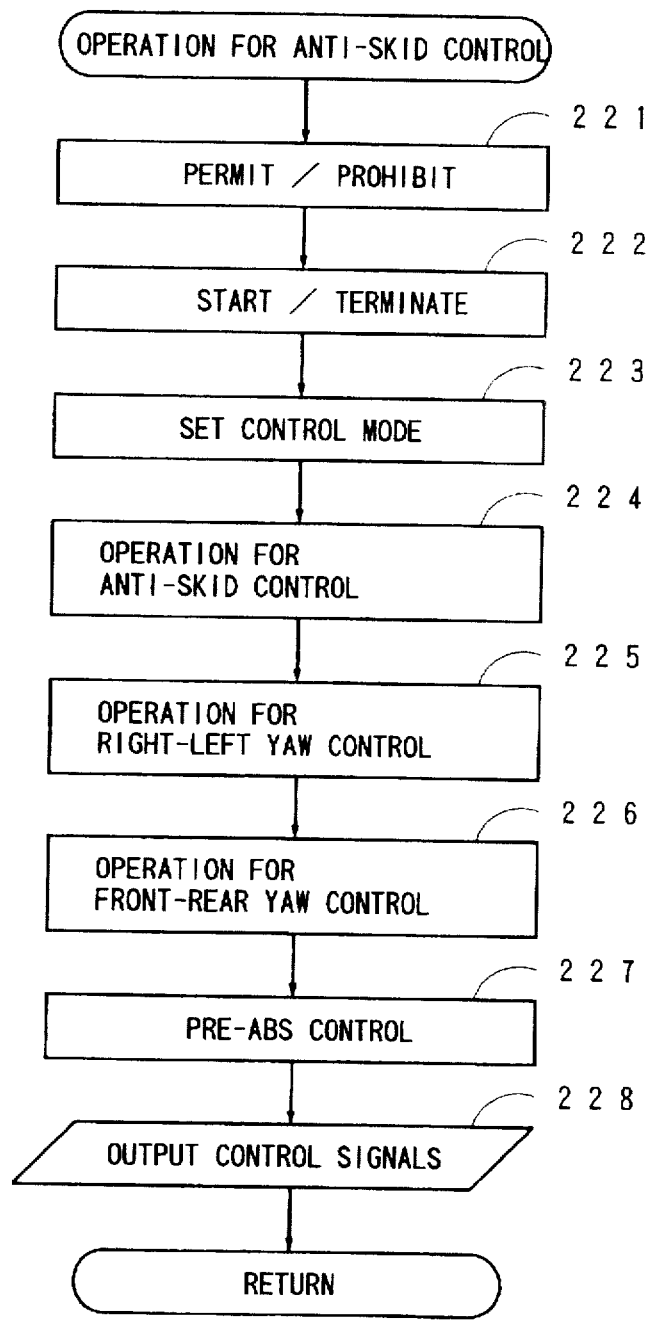
FIG. 8 is a flowchart showing an operation for an anti-skid control according to the above embodiment of the present invention.

FIG. 8 shows a flowchart of the operation for the anti-skid control executed at Step 220 or 320 in FIG. 5 or 6, wherein Step 225 is executed with respect to the front wheels, and Step 226 is executed with respect to the rear wheels, and the rest of the Steps are executed commonly with respect to the front and rear wheels. First of all, it is determined at Step 221 whether the anti-skid control is to be permitted or prohibited, and it is determined at Step 222 whether the anti-skid control is to be started or terminated. The program further proceeds to Step 223 where the control modes are set, and then proceeds to Step 224 where the operation for the anti-skid control is executed. If the wheel to be controlled is the front wheel, the operation for the right-left yaw control is executed at Step 225, while if the wheel to be controlled is the rear wheel, the operation for the front-rear yaw control is executed at Step 226. Then, the operation for the pre-ABS control is executed at Step 227, when the anti-skid control has not been started while it has been permitted. In accordance with the result of the operation as described above, control signals are output at Step 228.

Figure 9:
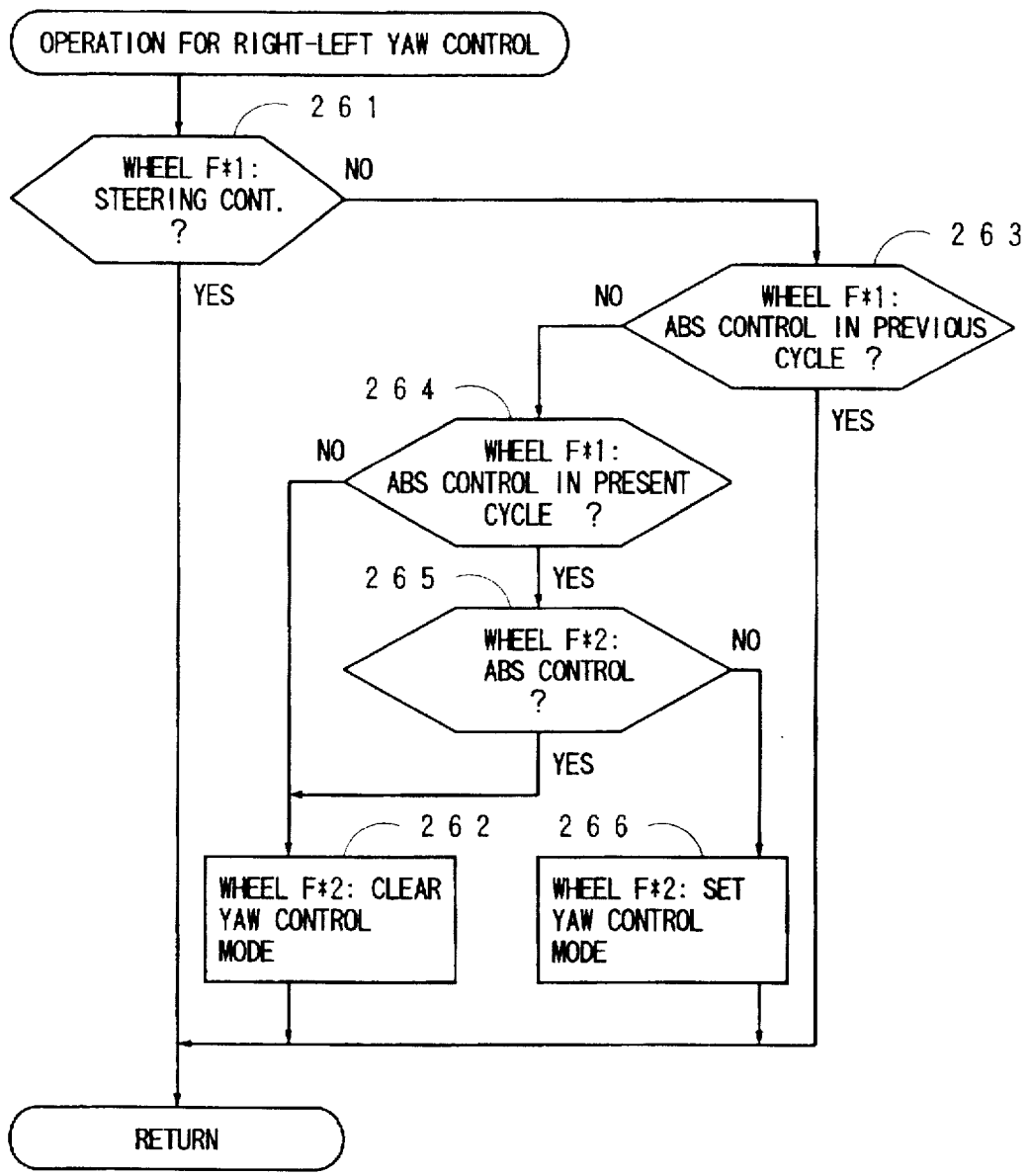
FIG. 9 is a flowchart showing an operation for a right-left yaw control with respect to the front wheels according to the above embodiment of the present invention.

FIG. 9 shows a flowchart of the operation for the right-left yaw control executed at Step 260 with respect to the front wheels. First, it is determined at Step 261 whether the steering control by braking is being performed or not, with respect to one of the front wheels (e.g., front right wheel) F*1. If it is determined at Step 261 that the steering control by braking is being performed with respect to the front wheel F*1, the program returns to the main routine, so as to avoid the yaw control induced through the steering control by braking. If it is determined at Step 261 that the steering control by braking has not been performed with respect to the front wheel F*1, the program further proceeds to Steps following Step 263. At Steps 263 to 265, it is determined whether the wheel F*1 is in the condition where the anti-skid control has started in the present cycle. That is, if it is determined at Step 263 that the anti-skid control already started in the previous cycle, the program returns to the main routine. On the contrary, if it is determined at Step 263 that the anti-skid control did not start in the previous cycle, but it is determined at Step 264 that the anti-skid control has started in the present cycle, the program proceeds to Step 265 where it is determined whether the other of the front wheels (e.g., front left wheel) F*2 is in the condition where the anti-skid control is being performed. If it is determined at Step 265 that the anti-skid control is not being performed with respect to the front wheel F*2, the program proceeds to Step 266 where the yaw control mode is set for the front wheel F*2. If it is determined at Step 264 that the anti-skid control is not being performed with respect to the front wheel F*1 in the present cycle, the program proceeds to Step 262 where the yaw control mode already set for the front wheel F*2 is cleared. In the case where it is determined at Step 264 that the anti-skid control is being performed with respect to the front wheel F*1 in the present cycle, and where it is determined at Step 265 that the anti-skid control is being performed with respect to the front wheel F*2, the program proceeds to Step 262 where the yaw control mode already set for the front wheel F*2 is cleared.

Figure 10:
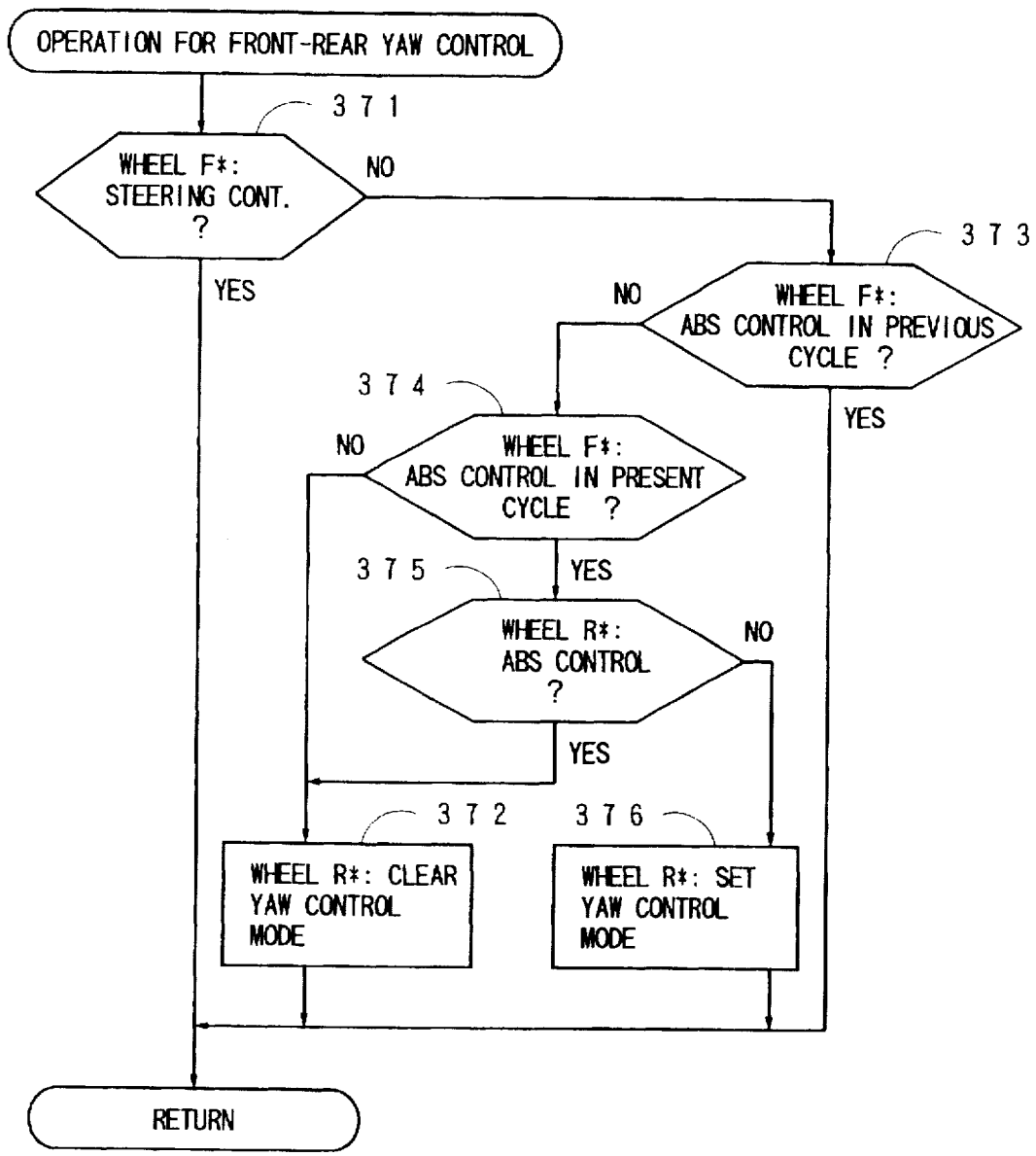
FIG. 10 is a flowchart showing an operation for a front-rear yaw control with respect to the rear wheels according to the above embodiment of the present invention.

FIG. 10 shows a flowchart of the operation for the front-rear yaw control executed at Step 370 with respect to the rear wheels. The yaw control mode is set or cleared with respect to the rear wheel R* (e.g., RR) which is placed on the same side of the curve as the front wheel F* (e.g., FR). First, it is determined at Step 371 whether the steering control by braking is being performed or not, with respect to the front wheel F*. If it is determined at Step 371 that the steering control by braking is being performed with respect to the front wheel F*, the program returns to the main routine, so as to avoid the yaw control induced through the steering control by braking. If it is determined at Step 373 that the anti-skid control already started in the previous cycle, the program returns to the main routine. However, if it is determined at Step 373 that the anti-skid control did not start in the previous cycle, but it is determined at Step 374 that the anti-skid control has started in the present cycle, the program proceeds to Step 375 where it is determined whether the rear wheel R* is in the condition where the anti-skid control is being performed. If it is determined at Step 375 that the anti-skid control is not being performed with respect to the rear wheel R*, the program proceeds to Step 376 where the yaw control mode is set for the rear wheel R*. If it is determined at Step 374 that the anti-skid control is not being performed with respect to the front wheel F* in the present cycle, the program proceeds to Step 372 where the yaw control mode already set for the rear wheel R* is cleared. In the case where it is determined at Step 374 that the anti-skid control is being performed with respect to the front wheel F* in the present cycle, and where it is determined at Step 375 that the anti-skid control is being performed with respect to the rear wheel R*, the program proceeds to Step 372 where the yaw control mode already set for the rear wheel R* is cleared.

Figure 11:
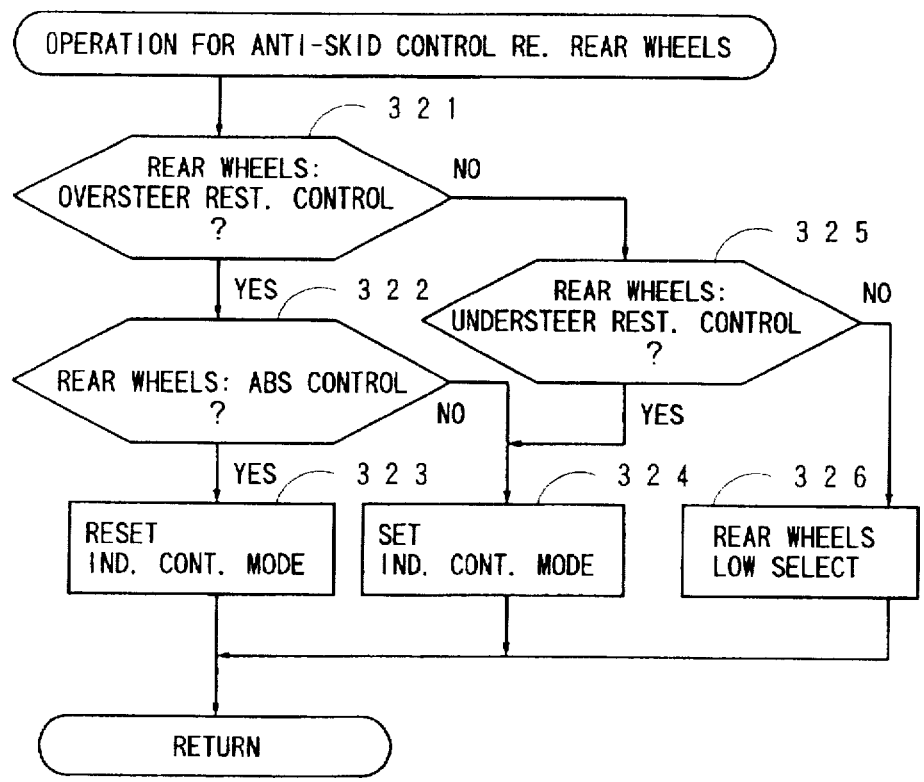
FIG. 11 is a flowchart showing an operation for the anti-skid control with respect to the rear wheels, according to the above embodiment of the present invention.

FIG. 11 shows a flowchart of the operation for the anti-skid control with respect to the rear wheels RR, RL, which is executed at Step 320 in FIG. 6. At the outset, it is determined at Step 321 whether the oversteer restraining control is being performed or not. If the oversteer restraining control is being performed, the program proceeds to Step 322, where it is determined whether the anti-skid control is being performed with respect to both of the rear wheels RR, RL. If the rear wheels RR, RL are under the anti-skid control, the program proceeds to Step 323 where an independent control mode is cleared. If at least one of the rear wheels RR, RL is not under the anti-skid control, the program proceeds to Step 324 where the independent control mode is set. In the case where it is determined at Step 321 that the oversteer restraining control is not being performed, the program further proceeds to Step 325, where it is determined whether the understeer restraining control is being performed, or not. If the result is affirmative, the program proceeds to Step 324 where the independent control mode is set, while if neither the oversteer restraining control nor the understeer restraining control is being performed, the program proceeds to Step 326, where the anti-skid control is performed according to a low select control mode for controlling the hydraulic pressure on the basis of one of the rear wheels rotating at a lower speed than the other rear wheel. In other words, the anti-skid control is performed as in the same manner as only the anti-skid control is performed, except when the steering control by braking is performed.

Figure 12:
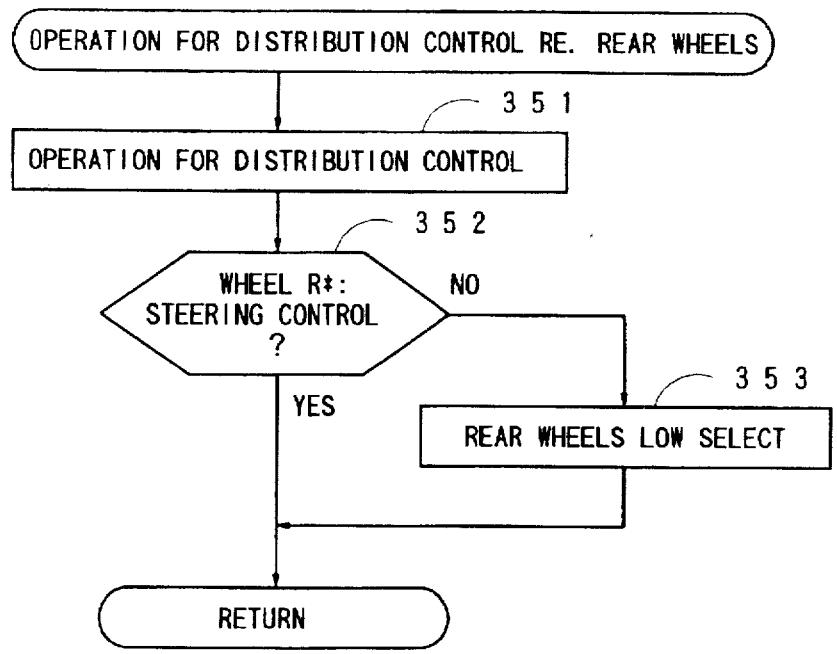
FIG. 12 is a flowchart showing an operation for a front-rear braking force distribution control with respect to the rear wheels, according to the above embodiment of the present invention.

FIG. 12 shows a flowchart of the operation for the front and rear braking force distribution control with respect to the rear wheels RR, RL, which is executed at Step 350 in FIG. 6. After the operation for the front and rear braking force distribution control is executed at Step 351, the program proceeds to Step 352 where it is determined whether the steering control by braking is being performed with respect to the rear wheel R* to be controlled. If it is determined that the steering control by braking is not being performed with respect to the rear wheel R*, the program proceeds to Step 353 where the anti-skid control is performed according to the low select control mode. However, if the steering control by braking is being performed, the program returns to the main routine. Further, during the anti-skid control, sometimes selected is a rough road control mode, wherein a desired slip rate is set to be relatively large. Even in the case where the rough road control mode has been selected, however, when the steering control by braking is to be performed, the rough road control mode is prohibited, so that the ordinary control will be performed.

Figure 13:
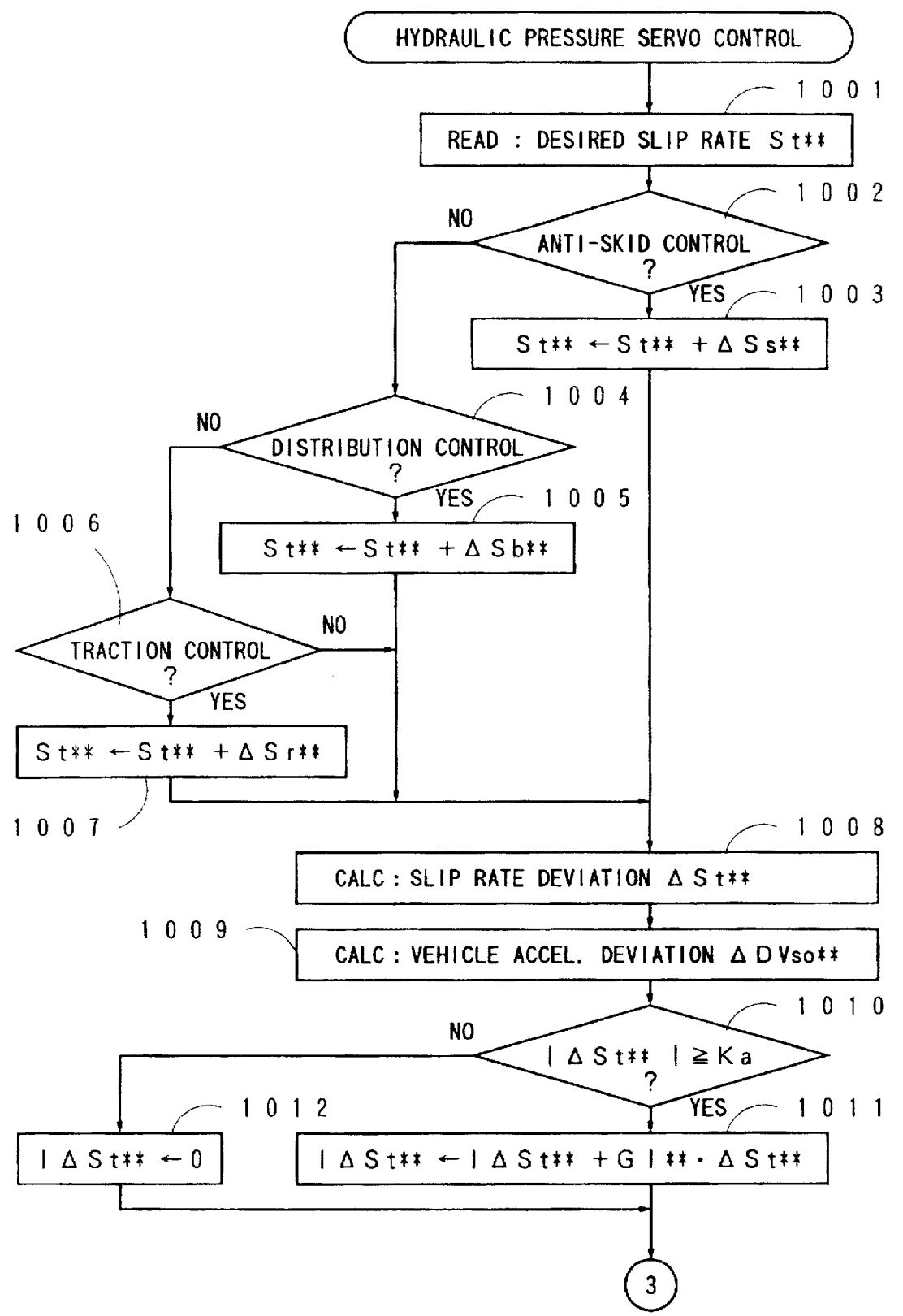
FIG. 13 is a flowchart showing a hydraulic pressure servo control according to the above embodiment of the present invention.
Figure 14:
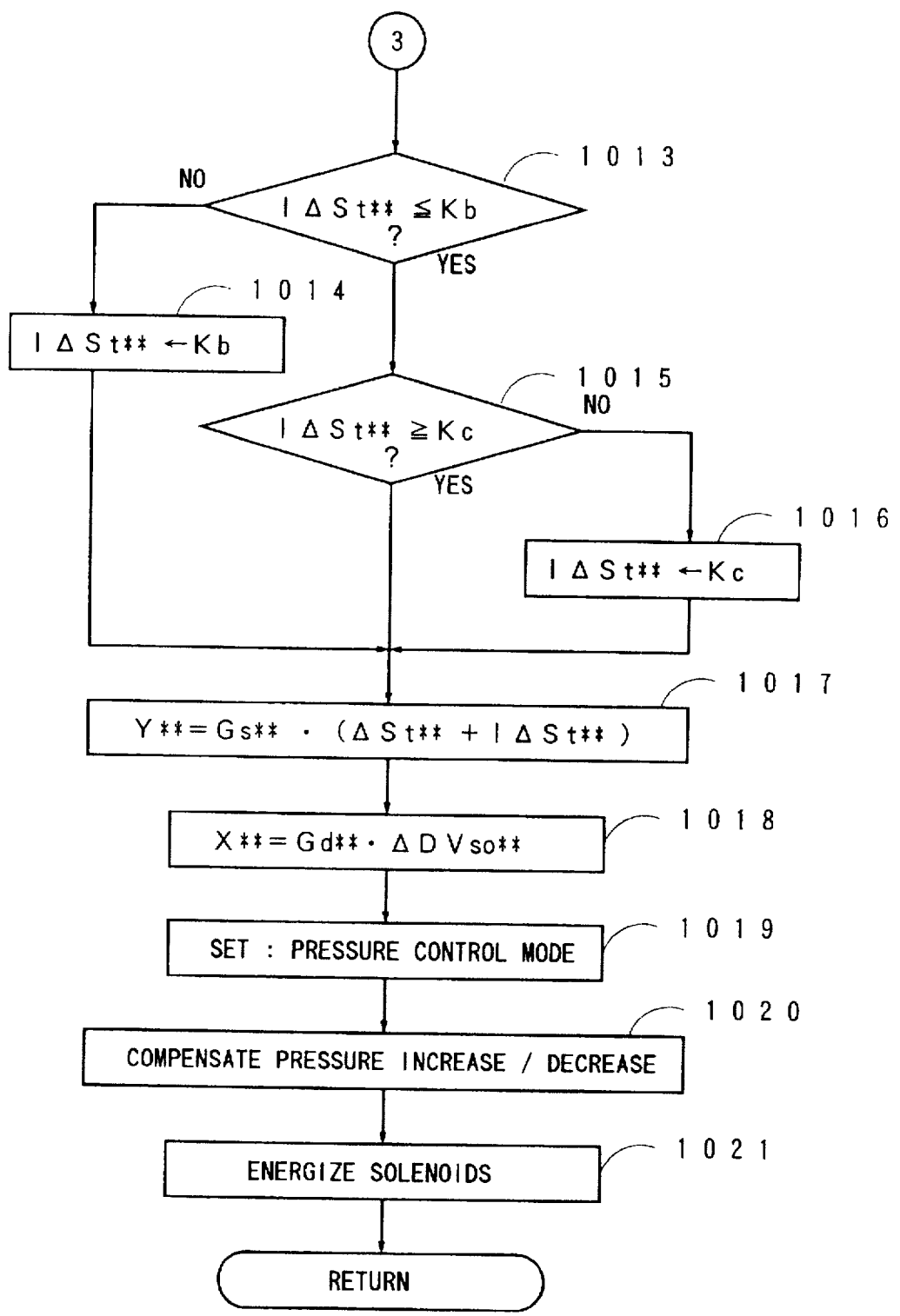
FIG. 14 is a flowchart showing the hydraulic pressure servo control according to the above embodiment of the present invention.

FIGS. 13 and 14 show the hydraulic pressure servo control which is performed at Step 107 as shown in FIG. 4, and wherein the wheel cylinder pressure for each wheel is controlled through the slip rate servo control. At Step 1001, the desired slip rates St are read to provide the desired slip rate for each wheel of the vehicle. Then, the program proceeds to Step 1002 where it is determined whether the anti-skid control is to be performed or not. If the result is affirmative, the program proceeds to Step 1003 where a compensating slip rate for the anti-skid control ΔSs is added to the desired slip rate St to renew the the desired slip rate St. If it is determined at Step 1002 that the anti-skid control is not to be performed, the program proceeds to Step 1004 where it is determined whether the front and rear braking force distribution control is to be performed or not. If the result is affirmative, the program proceeds to Step 1005 where a compensating slip rate for the braking force distribution control ΔSb is added to the desired slip rate St to renew it. If it is determined at Step 1004 that the braking force distribution control is not to be performed, the program proceeds to Step 1006 where it is determined whether the traction control is to be performed or not. If the result is affirmative, the program proceeds to Step 1007 where a compensating slip rate for the traction control ΔSr is added to the desired slip rate St to renew it. After the desired slip rate St is renewed at Step 1003, 1005 or 1007, the program proceeds to Step 1008, where a slip rate deviation ΔSt is calculated for each wheel, and further proceeds to Step 1009 where a vehicle acceleration deviation ΔDVso** is calculated. If it is determined at Step 1006 that the traction control is not to be performed, the program directly proceeds to Step 1008. The desired slip rates for the control modes as shown in FIGS. 5 and 6 other than the above-described anti-skid control, braking force distribution control and traction control are omitted in FIG. 13, but shall be provided as well.

At Step 1008, the difference between the desired slip rate St and the actual slip rate Sa is calculated to provide the slip rate deviation ΔSt (i.e., ΔSt=St−Sa). And, at Step 1009, the difference between the vehicle acceleration DVso of a wheel to be controlled and that of the reference wheel (i.e., non-driven wheel) is calculated to provide the vehicle acceleration deviation ΔDVso. The actual slip rate Sa and the vehicle acceleration deviation ΔDVso may be calculated in accordance with a specific manner which is determined in dependence upon the control modes such as the anti-skid control, traction control and the like.

Then, the program proceeds to Step 1010 where the slip rate deviation ΔSt is compared with a predetermined value Ka. If an absolute value of the slip rate deviation |ΔSt| is equal to or greater than the predetermined value Ka, the program proceeds to Step 1011 where an integrated value (I ΔSt) of the slip rate deviation ΔSt is renewed. That is, a value of the slip rate deviation ΔSt multiplied by a gain GI is added to the integrated value of the slip rate deviation I ΔSt obtained in the previous cycle of this routine to provide the integrated value of the slip rate deviation I ΔSt in the present cycle. If the absolute value of the slip rate deviation |ΔSt| is smaller than the predetermined value Ka, the program proceeds to Step 1012 where the integrated value of the slip rate deviationI ΔSt is cleared to be zero (0). Then, the program proceeds to Steps 1013 to 1016 as shown in FIG. 14 where the slip rate deviation I ΔSt is limited to a value which is equal to or smaller than an upper limit value Kb, or which is equal to or greater than a lower limit value Kc. If the slip rate deviation I ΔSt is greater than the upper limit Kb, it is set to be the value Kb at Step 1014, whereas if the slip rate deviation I ΔSt** is smaller than the lower limit Kc, it is set to be the value Kc at Step 1016.

Figure 15:
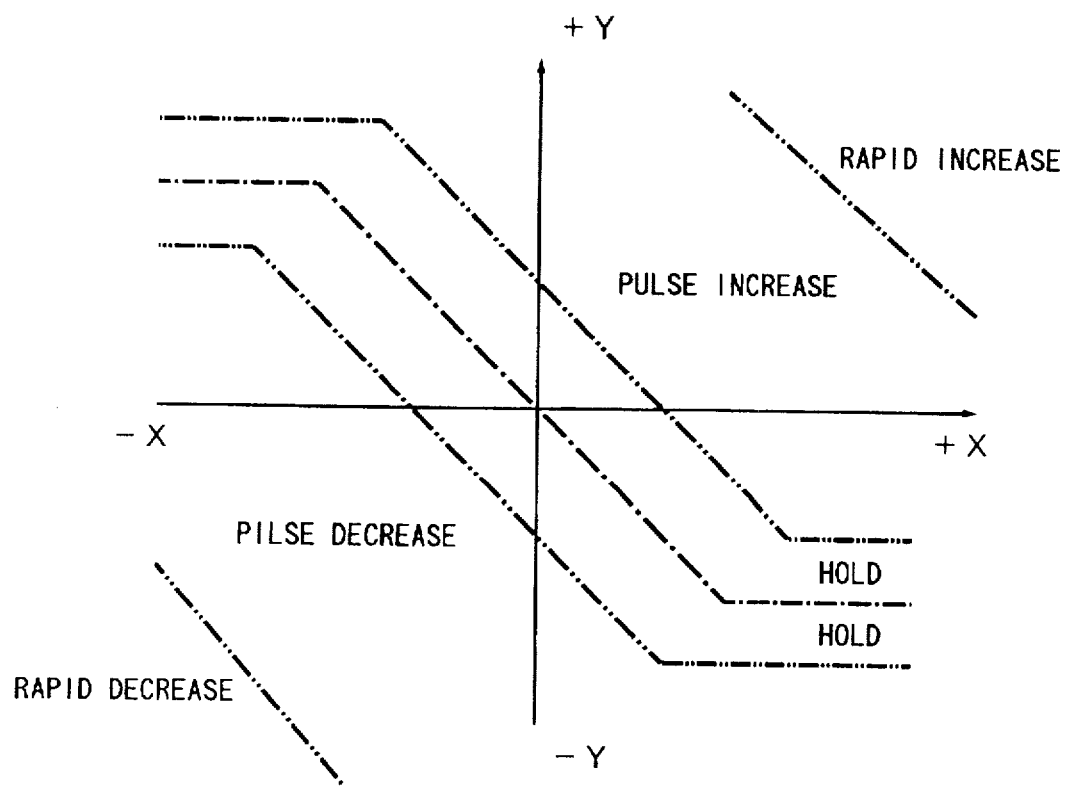
FIG. 15 is a diagram showing the relationship between the pressure control modes and parameters for use in the hydraulic braking pressure control according to the above embodiment.
Figure 16:
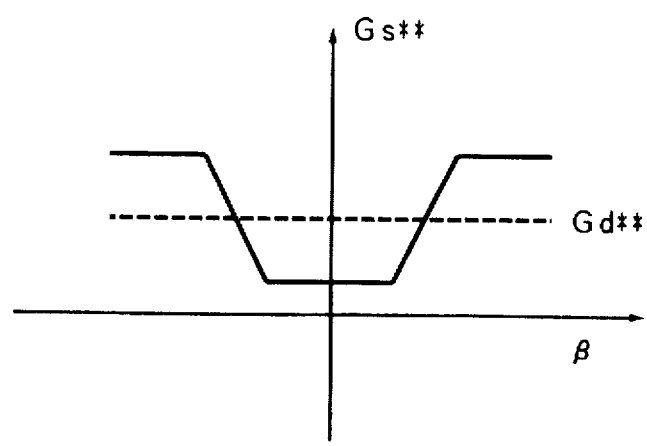
FIG. 16 is a diagram showing the relationship between a vehicle slip angle and a gain for calculating the parameters according to the above embodiment.

Thereafter, the program proceeds to Step 1017 where a parameter Y** for providing a hydraulic pressure control in each control mode is calculated in accordance with the following equation:

$$Y^{}=Gs^{}\cdot(\Delta St^{}+I\ \Delta St^{})$$

where "Gs" is a gain, which is provided in response to the vehicle slip angle β and in accordance with a diagram as shown by a solid line in FIG. 16. The program further proceeds to Step 1018 where another parameter X is calculated in accordance with the following equation:

$$X^{}=Gd^{}\cdot\Delta DVso^{**}$$

where "Gd" is a gain which is a constant value as shown by a broken line in FIG. 16. On the basis of the parameters X and Y, a pressure control mode for each wheel is provided at Step 1019, in accordance with a control map as shown in FIG. 15. The control map has a rapid pressure decreasing zone, a pulse pressure decreasing zone, a pressure holding zone, a pulse pressure increasing zone, and a rapid pressure increasing zone which are provided in advance as shown in FIG. 15, so that any one of the zones is selected in accordance with the parameters X and Y** at Step 1019. In this respect, the pressure control mode is not to be set under the non-control condition so that every solenoids will be de-energized.

At Step 1020, is performed a pressure increase and decrease compensating control, which is required for smoothing the first transition and last transition of the hydraulic pressure, when the presently selected zone is changed from the previously selected zone at Step 1019, e.g., from the pressure increasing zone to the pressure decreasing zone, or vice versa. For instance, when the zone is changed from the rapid pressure decreasing zone to the pulse pressure increasing zone, an increasing time of a duty for a pressure increasing pulse signal is set in accordance with a period of time during which the rapid pressure decreasing zone immediately before the pressure increasing zone continues. Finally, the program proceeds to Step 1021 where a solenoid of each valve in the hydraulic pressure control apparatus PC is energized or de-energized in accordance with the selected pressure control zone thereby to control the braking force applied to each wheel.

FIG. 17 shows an embodiment of the hydraulic braking pressure control apparatus PC which includes a master cylinder MC and a hydraulic booster HB which are activated in response to depression of the brake pedal BP. The hydraulic booster HB is connected to an auxiliary pressure source AP, both of which are connected to a low pressure reservoir RS, to which the master cylinder MC is connected, as well. The auxiliary pressure source AP includes a hydraulic pressure pump HP and an accumulator AC. The pump HP is driven by an electric motor M to pressurize a brake fluid in the reservoir RS to discharge the pressurized brake fluid, or hydraulic braking pressure through a check valve CV6, into the accumulator AC to accumulate it therein. The electric motor M starts to operate when the pressure in the accumulator AC is decreased to be less than a predetermined lower limit, and stops when the pressure in the accumulator AC is increased to exceed a predetermined upper limit. A relief valve RV is provided between the accumulator AC and the reservoir RS. Accordingly, it is so arranged that a so-called power pressure is properly supplied from the accumulator AC to the hydraulic booster HB. The hydraulic booster HB introduces the hydraulic braking pressure discharged from the auxiliary pressure source AP and regulates it to a boost pressure in proportion to a pilot pressure discharged from the master cylinder MC, which is boosted by the boost pressure.

In a hydraulic pressure circuit for connecting the master cylinder MC with each of the front wheel brake cylinders Wfr, Wfl, disposed are solenoid valves SA1 and SA2 which are connected to solenoid valves PC1, PC5 and solenoid valves PC2, PC6, through control passages Pfr and Pfl, respectively. In the hydraulic pressure circuits for connecting the hydraulic booster HB with each of the wheel brake cylinder Wrl and etc., a solenoid valve SA3, solenoid valves PC1-PC8 for use in the control of discharging and draining of the brake fluid are disposed, and a proportioning pressure decreasing valve PV is disposed at the rear wheels' side. Then, the auxiliary pressure source AP is connected to the downstream side of the solenoid valve SA3 through a solenoid valve STR. The hydraulic circuits are divided into the front circuit system and the rear circuit system as shown in FIG. 17 to form the front and rear dual circuit system according to the present embodiment.

With respect to the front hydraulic pressure circuit, the solenoid valves PC1 and PC2 are connected to the solenoid valve STR, which is of a two-port two-position solenoid operated valve normally closed and activated to communicate the solenoid valves PC1 and PC2 directly with the accumulator AC. The solenoid valves SA1 and SA2 are of a three-port two-position solenoid operated valve which is placed in a first operating position as shown in FIG. 17, when it is not energized, through which each of the wheel brake cylinders Wfr and Wfl is communicated with the master cylinder MC. When the solenoid valves SA1 and SA2 are energized, they are placed in their second operating positions, respectively, where both of the wheel brake cylinders Wfr and Wfl are prevented from communicating with the master cylinder MC, while the wheel brake cylinder Wfr is communicated with the solenoid valves PC1 and PC5, and the wheel brake cylinder Wfl is communicated with the solenoid valves PC2 and PC6, respectively. In parallel with the solenoid valves PC1 and PC2, check valves CV1 and CV2 are disposed, respectively. The inlet side of the check valve CV1 is connected to the passage Pfr, and the inlet side of the check valve CV2 is connected to the passage Pfl. The check valve CV1 is provided for allowing the flow of the brake fluid toward the hydraulic booster HB and preventing the reverse flow. In the case where the solenoid valve SA1 is energized to be placed in its second position, therefore, if the brake pedal BP is released, the hydraulic pressure in the wheel brake cylinder Wfr is rapidly reduced to the pressure discharged from the hydraulic booster HB. The check valve CV2 is provided in the same manner as the check valve CV1.

With respect to the rear hydraulic pressure circuit, the solenoid valve SA3 is of a two-port two-position solenoid operated valve, which is normally opened as shown in FIG. 17, so that the solenoid valves PC3 and PC4 are communicated with the hydraulic booster HB through the proportioning valve PV. In this case, the solenoid valve STR is placed in its closed position to shut off the communication with the accumulator AC. When the solenoid valve SA3 is energized, it is placed in its closed position, where both of the solenoid valves PC3 and PC4 are prevented from communicating with the hydraulic booster HB, while they are communicated with the solenoid valve STR through the proportioning valve PV, so that they are communicated with the accumulator AC when the solenoid valve STR is energized. In parallel with the solenoid valves PC3 and PC4, check valves CV3 and CV4 are disposed, respectively. The inlet side of the check valve CV3 is connected to the wheel brake cylinder Wrr, and the inlet side of the check valve CV4 is connected to the wheel brake cylinder Wrl. The check valves CV3 and CV4 are provided for allowing the flow of the brake fluid toward the solenoid valve SA3 and preventing the reverse flow. If the brake pedal BP is released, therefore, the hydraulic pressure in each of the wheel brake cylinders Wrr, Wrl is rapidly reduced to the pressure discharged from the hydraulic booster HB. Furthermore, the check valve CV5 is disposed in parallel with the solenoid valve SA3, so that the brake fluid may be supplied from the hydraulic booster HB to the wheel brake cylinders in response to depression of the brake pedal BP.

The above-described solenoid valves SA1, SA2, SA3, STR, and solenoid valves PC1-PC8 are controlled by the electronic controller ECU to provide various control modes for controlling the stability of the vehicle, such as the steering control by braking, anti-skid control, and other various control modes. For example, when the steering control by braking, which is to be executed irrespective of depression of the brake pedal BP, is performed, the hydraulic pressure is not discharged from the hydraulic booster HB and master cylinder MC. Therefore, the solenoid valves SA1 and SA2 are placed in their second positions, the solenoid valve SA3 is placed in its closed position, and then the solenoid valve STR is placed in its open position, so that the power pressure can be discharged to the wheel brake cylinder Wfr and so on, through the solenoid valve STR and any of the solenoid valves PC1-PC8 placed in their open positions. Consequently, with the solenoid valves PC1-PC8 energized or de-energized, the hydraulic pressure in each wheel cylinder is rapidly increased in the rapid pressure increasing zone, gradually increased in the pulse pressure increasing zone, gradually decreased in the pulse pressure decreasing zone, rapidly decreased in the rapid pressure decreasing zone, and held in the pressure holding zone, so that the steering control by braking, the anti-skid control and the like can be performed, as noted previously. In addition to the braking force control as described above, the sub-throttle opening angle for the throttle control apparatus TH may be adjusted in response to the condition of the vehicle in motion, so that the output of the engine EG could be reduced to limit the driving force produced thereby.

It should be apparent to one skilled in the art that the above-described embodiment is merely illustrative of but one of the many possible specific embodiments of the present invention. For example, the present invention may be applied to a front drive vehicle, or even to a four-wheel drive vehicle. With respect to the four-wheel drive vehicle, however, all the wheels are to be controlled, so that a vehicle speed can not be estimated in accordance with the outputs of the wheel speed sensors. In this case, therefore, an extra sensor for detecting the vehicle speed is needed. Numerous and various other arrangements can be readily devised by those skilled in the art without departing from the spirit and scope of the invention as defined in the following claims.

What is claimed is:

1. A vehicle motion control system for maintaining stability of an automotive vehicle when said vehicle in motion, by controlling a braking force applied to the front and rear wheels of said vehicle, comprising:

vehicle condition monitor means for monitoring a condition of said vehicle in motion;

braking means for applying a braking force to each wheel of said vehicle, said braking means actuated in response to depression of a brake pedal, and said braking means actuated on the basis of an output of said monitor means and irrespective of depression of said brake pedal;

steering control means for actuating said braking means to apply the braking force to at least one of said wheels on the basis of the output of said monitor means and irrespective of depression of said brake pedal;

anti-skid control means for actuating said braking means to control the braking force applied to at least one of said wheels in response to a rotational condition thereof during braking, on the basis of the output of said monitor means;

subordinate control means for actuating said braking means to adjust the braking force control performed by said anti-skid control means, in accordance with a predetermined relationship between said anti-skid control means and said subordinate control means; and priority control means for giving priority said anti-skid control means over said steering control means, and giving priority said steering control means over said subordinate control means, when a condition for starting the braking force control performed by both of said anti-skid control means and said steering control means is fulfilled with respect to at least one of said wheels.

2. The vehicle motion control system as claimed in claim 1, wherein said subordinate control means includes:

yaw control means for controlling the braking force applied to at least one wheel to be controlled out of said wheels, in accordance with a predetermined relationship with the braking force applied to at least one of the rest of said wheels, and on the basis of a relationship between said wheels during the control performed by said anti-skid control means, and further comprising:

limiting means for preventing said yaw control means from controlling the braking force applied to said at least one wheel to be controlled in accordance with the control performed by said steering control means, when the braking force is controlled by said anti-skid control means and said subordinate control means with respect to said at least one wheel to be controlled.

3. The vehicle motion control system as claimed in claim 2, wherein said yaw control means includes right-left yaw control means for reducing an increasing rate of the braking force applied to one of said front wheels, when the braking force applied to the other one of said front wheels is controlled by said anti-skid control means.

4. The vehicle motion control system as claimed in claim 2, wherein said yaw control means includes front-rear yaw control means for reducing an increasing rate of the braking force applied to at least one of said rear wheels, when the braking force applied to one of said front wheels is controlled by said anti-skid control means.

5. The vehicle motion control system as claimed in claim 1, wherein said subordinate control means includes pre-control means for applying the braking force to said at least one wheel to be controlled, in advance of the braking force control initiated by said anti-skid control means and/or said steering control means, and wherein said priority control means is adapted to give priority said steering control means over said pre-control means.

6. The vehicle motion control system as claimed in claim 1, wherein said braking means comprises:

wheel brake cylinders operatively connected to said front and rear wheels for applying the braking force thereto, respectively;

a hydraulic pressure generator for supplying a hydraulic pressure to said wheel brake cylinders; and actuating means disposed between said hydraulic pressure generator and said wheel brake cylinders for controlling the hydraulic pressure in said wheel brake cylinders, said actuating means activated by said steering control means, said anti-skid control means and said subordinate control means.

7. The vehicle motion control system as claimed in claim 6, wherein said subordinate control means includes pre-anti-skid control means for activating said actuating means to control the hydraulic pressure in said wheel brake cylinders, in advance of the braking force control initiated by said anti-skid control means, and wherein said priority control means is adapted to give priority said steering control means over said pre-anti-skid control means.

8. The vehicle motion control system as claimed in claim 6, wherein said subordinate control means includes pre-steering control means for activating said actuating means to control the hydraulic pressure in said wheel brake cylinders, in advance of the braking force control initiated by said steering control means, and wherein said priority control means is adapted to give priority said steering control means over said pre-steering control means.

9. The vehicle motion control system as claimed in claim 1, wherein said steering control means includes:

oversteer restraining control means for actuating said braking means to apply the braking force to at least one of said wheels on the basis of the output of said monitor means and irrespective of depression of said brake pedal, said oversteer restraining control means actuating said braking means to apply the braking force to at least one of said wheels so as to cause an increase in turning radius, when an excessive oversteer occurs during vehicle motion; and understeer restraining control means for actuating said braking means to apply the braking force to at least one of said wheels on the basis of the output of said monitor means and irrespective of depression of said brake pedal, said understeer restraining control means actuating said braking means to apply the braking force to at least one of said wheels so as to cause a decrease in turning radius, when an excessive understeer occurs during vehicle motion.

* * * * *